US012601438B2

(12) United States Patent
Nagamori

(10) Patent No.: US 12,601,438 B2
(45) Date of Patent: Apr. 14, 2026

(54) SLUICE VALVE INSTALLATION METHOD, AND SLUICE VALVE INSTALLATION STRUCTURE USED IN SLUICE VALVE INSTALLATION METHOD

(71) Applicant: WATERWORKS TECHNOLOGY DEVELOPMENT ORGANIZATION CO., LTD., Osaka (JP)

(72) Inventor: Yasuyuki Nagamori, Osaka (JP)

(73) Assignee: WATERWORKS TECHNOLOGY DEVELOPMENT ORGANIZATION CO., LTD., Osaka (JP)

( * ) Notice: Subject to any disclaimer, the term of this patent is extended or adjusted under 35 U.S.C. 154(b) by 44 days.

(21) Appl. No.: 18/859,698

(22) PCT Filed: Apr. 20, 2023

(86) PCT No.: PCT/JP2023/015792
§ 371 (c)(1),
(2) Date: Oct. 24, 2024

(87) PCT Pub. No.: WO2023/210501
PCT Pub. Date: Nov. 2, 2023

(65) Prior Publication Data
US 2025/0277552 A1     Sep. 4, 2025

(30) Foreign Application Priority Data
Apr. 25, 2022     (JP) ................................. 2022-071668

(51) Int. Cl.
*F16L 41/06*          (2006.01)
*F16L 55/124*         (2006.01)

(52) U.S. Cl.
CPC ............. *F16L 41/06* (2013.01); *F16L 55/124* (2013.01)

(58) Field of Classification Search
CPC ........ F16L 41/06; F16L 55/124; F16K 27/044
See application file for complete search history.

(56) References Cited

U.S. PATENT DOCUMENTS 4,972,577 A      11/1990  Dierikx
2004/0222399 A1*  11/2004  Maichel .................. F16L 41/06
                                                    251/326
(Continued)

FOREIGN PATENT DOCUMENTS

JP          3474003  B2    12/2003
JP        201096241  A      4/2010
(Continued)

*Primary Examiner* — P. Macade Nichols
(74) *Attorney, Agent, or Firm* — The Webb Law Firm

(57)          ABSTRACT
A sluice valve installation method includes attaching a housing and a work valve to a fluid pipe, opening and closing the work valve to perforate the fluid pipe to form a through-hole, and opening and closing the work valve to attach a valve cover incorporating a valve body to the housing. Opening and closing the work valve to attach the valve cover includes inserting a valve cover-side bayonet claw portion into a fitting groove portion through a claw insertion portion at a valve cover attachment/detachment position where the valve cover-side bayonet claw portion does not interfere with a housing-side bayonet claw portion to insert the valve body of the valve cover into a valve cover mounting opening portion, and rotating the valve cover with respect to the housing in a state in which the valve cover-side bayonet claw portion is fitted into the fitting groove portion.

7 Claims, 16 Drawing Sheets

(56) References Cited

U.S. PATENT DOCUMENTS

| | | | |
|---|---|---|---|
| 2006/0097215 A1 | 5/2006 | Pohn et al. | |
| 2013/0000749 A1* | 1/2013 | Sato ........................ | F16L 41/06 |
| | | | 137/318 |
| 2016/0230897 A1 | 8/2016 | Munetomo et al. | |
| 2021/0222816 A1 | 7/2021 | Horikawa et al. | |

FOREIGN PATENT DOCUMENTS

| | | | |
|---|---|---|---|
| JP | 2012172731 A | 9/2012 |
| JP | 201581621 A | 4/2015 |
| JP | 2015224770 A | 12/2015 |
| JP | 6978082 B2 | 12/2021 |
| WO | 2004003413 A1 | 1/2004 |
| WO | 2020049922 A1 | 3/2020 |

* cited by examiner

SLUICE VALVE INSTALLATION METHOD, AND SLUICE VALVE INSTALLATION STRUCTURE USED IN SLUICE VALVE INSTALLATION METHOD

CROSS-REFERENCE TO RELATED APPLICATIONS

This application is the United States national phase of International Patent Application No. PCT/JP2023/015792 filed Apr. 20, 2023, and claims priority to Japanese Patent Application No. 2022-071668 filed Apr. 25, 2022, the disclosures of which are hereby incorporated by reference in their entireties.

BACKGROUND OF THE INVENTION

Field of the Invention

The present invention relates to a sluice valve installation method for installing a sluice valve capable of opening and closing a flow passage of a fluid pipe in the fluid pipe in an uninterrupted flow state, and a sluice valve installation structure used in the sluice valve installation method.

Description of Related Art

In the related art, a sluice valve is known which includes a housing and a valve cover incorporating a valve body and in which the valve cover is attached to a valve cover mounting opening portion of the housing attached to a fluid pipe, so that the valve body is inserted into the fluid pipe in a direction perpendicular to a pipe axial direction of the fluid pipe, and a flow of fluid in the fluid pipe can be blocked (for example, see Japanese Patent No. 6978082 and Japanese Patent No. 3474003).

A sluice valve installation method for such a sluice valve performs a first step of attaching the housing and a work valve capable of opening and closing a valve cover mounting opening portion of the housing to the fluid pipe, a second step of perforating the fluid pipe to form a through-hole through the valve cover mounting opening portion of the housing by opening and closing the work valve, and a third step of attaching the valve cover to the valve cover mounting opening portion of the housing in a state in which a valve body is insertable into the fluid pipe through the through-hole by opening and closing the work valve. By performing each of these steps in an uninterrupted flow state, the valve body can be inserted into and removed from the fluid pipe through the through-hole of the fluid pipe, and the flow passage of the fluid pipe can be opened and closed.

In this case, in the third step, various attachment methods are adopted for an attachment method of attaching the valve cover to the valve cover mounting opening portion of the housing.

In the attachment method described in Japanese Patent No. 6978082, a housing-side flange is formed on the valve cover mounting opening portion of the housing, a valve cover-side flange is formed on a connection opening portion of the valve cover, the housing-side flange and the valve cover-side flange are overlapped with each other in a state of sealing the valve cover mounting opening portion of the housing and the connection opening portion of the valve cover, and the housing-side flange and the valve cover-side flange are connected to each other by a connecting tool such as a connecting bolt, thereby attaching the valve cover to the valve cover mounting opening portion of the housing in a state in which the flanges are abutted against each other.

In the attachment method described in Japanese Patent No. 3474003, a housing-side screw portion is formed on an inner wall portion of the valve cover mounting opening portion of the housing, a valve cover-side screw portion is formed on an outer wall portion of the valve cover, and the housing-side screw portion and the valve cover-side screw portion are screwed to each other when the valve cover is inserted into the housing, thereby attaching the valve cover to the valve cover mounting opening portion of the housing in a state in which the valve body is inserted into the housing.

In the attachment method described in Japanese Patent No. 6978082, since the flanges that protrude to an outer peripheral side are formed on both the valve cover mounting opening portion of the housing and the valve cover, a size of an attachment portion between the valve cover mounting opening portion of the housing and the valve body increases, which not only causes the attachment portion to increase in size but also requires a large work space to be secured. In a case where the size of the valve cover mounting opening portion of the housing or the valve cover increases, the handling of the housing or the valve cover becomes cumbersome, which causes installation work of the sluice valve to be complicated and troublesome. In addition, for example, in a case where the fluid pipe is installed indoors, such as above a ceiling or under a floor, it is difficult to secure a large work space, and from this point as well, the installation work of the sluice valve is complicated and troublesome.

In the attachment method described in Japanese Patent No. 3474003, since the valve cover is attached to the valve cover mounting opening portion of the housing in a state in which the valve body is inserted into the housing, the flanges described in Japanese Patent No. 6978082 may be dispensable, and an increase in the size of the attachment portion between the valve cover mounting opening portion of the housing and the valve cover can be prevented.

However, since the housing-side screw portion and the valve cover-side screw portion are screwed to each other when the valve cover is inserted into the housing, screwing work thereof is complicated and troublesome. For example, in a case where the valve cover is inclined with respect to the valve cover mounting opening portion of the housing, the housing-side screw portion and the valve cover-side screw portion will not mesh properly. Therefore, it is necessary to perform the screwing work while maintaining an appropriate posture between the housing and the valve cover throughout the start to the end of the screwing work, which is a very time-consuming work. In addition, in a case where the screw portions are forcibly screwed together, problems such as damage to screw threads are caused, which requires the screwing work to be performed while repeating tightening and loosening.

SUMMARY OF THE INVENTION

In view of this situation, a main object of the present invention is to provide a sluice valve installation method and a sluice valve installation structure used in the sluice valve installation method with which installation work of a sluice valve can be simplified while preventing an attachment portion between a housing and a valve cover from being increased in size.

A first characteristic configuration of the present invention relates to a sluice valve installation method of installing a sluice valve, which is capable of opening and closing a flow passage of a fluid pipe, in the fluid pipe in an uninterrupted flow state, the method including: a first step of attaching a housing of the sluice valve and a work valve capable of opening and closing a valve cover mounting opening portion of the housing to the fluid pipe; a second step of opening and closing the work valve to perforate a through-hole in the fluid pipe through the valve cover mounting opening portion of the housing; and a third step of opening and closing the work valve to attach a valve cover incorporating a valve body to the housing in a state in which the valve body of the sluice valve is insertable into the fluid pipe through the through-hole of the fluid pipe, in which the third step includes an insertion step of inserting a valve cover-side bayonet claw portion provided in the valve cover into a fitting groove portion provided in the valve cover mounting opening portion of the housing through a claw insertion portion provided in the valve cover mounting opening portion of the housing at a valve cover attachment/detachment position where the valve cover-side bayonet claw portion does not interfere with a housing-side bayonet claw portion corresponding to a part of the fitting groove portion to insert the valve body of the valve cover into the valve cover mounting opening portion of the housing, and a rotation step of rotating the valve cover with respect to the housing in a state in which the valve cover-side bayonet claw portion is fitted into the fitting groove portion of the housing to cause the valve cover-side bayonet claw portion and the housing-side bayonet claw portion to be engaged with each other in a retaining manner in a valve body insertion direction.

According to the present configuration, in the third step, by performing the insertion step and the rotation step, the valve cover can be attached to the valve cover mounting opening portion of the housing in a state in which the valve body is inserted into the housing, so that the valve cover can be attached in a state in which the valve body is insertable into the fluid pipe through the through-hole of the fluid pipe. In this way, since the valve cover is attached to the valve cover mounting opening portion of the housing in a state in which the valve body is inserted into the housing, the flanges described in Japanese Patent No. 6978082 may not be provided, and an increase in the size of the attachment portion between the valve cover mounting opening portion of the housing and the valve cover can be prevented. In addition, in the insertion step and the rotation step, it is only necessary to perform a simple work of inserting the valve body of the valve cover into the housing through the valve cover mounting opening portion of the housing and rotating the valve cover with respect to the housing, and thus the installation work of the sluice valve can be simplified.

A second characteristic configuration of the present invention is that, in the third step, after the insertion step and the rotation step, a covering body attachment step of attaching a covering body that covers a part of the valve cover in a rotation restricting state in which the covering body abuts on the valve cover to restrict rotation of the valve cover is performed.

In a case of opening and closing the flow passage of the fluid pipe by the sluice valve, the valve body is inserted and removed through the through-hole of the fluid pipe to open and close the flow passage of the fluid pipe by applying a rotational operation force to a valve operating shaft of the valve cover. In this case, when the valve cover is also rotationally moved, there is a possibility that the rotational operation force cannot be appropriately applied because there is flexibility (play) until the valve body can be actually operated, so that an operation amount of the valve body is smaller than an operation amount of the rotational operation force, or the like.

Therefore, with the present configuration, by performing the covering body attachment step following the insertion step and the rotation step to attach the covering body in a rotation restricting state in which the covering body abuts on the valve cover to restrict the rotation of the valve cover, it is possible to prevent the valve cover from rotationally moving in a case where the rotational operation force is applied to the valve operating shaft of the valve cover, and it is possible to appropriately apply the rotational operation force. In addition, by restricting the rotational movement of the valve cover, it is also possible to prevent the valve cover from rotationally moving in a direction opposite to the rotation step. Therefore, it is possible to prevent occurrence of inconvenience such as the valve cover accidentally rotationally moving in the opposite direction, which releases retaining engagement between the valve cover-side bayonet claw portion and the housing-side bayonet claw portion in the valve body insertion direction to cause the valve cover to be detached from the housing.

A third characteristic configuration of the present invention is that, in the rotation step, the valve cover is rotated with respect to the housing by a predetermined rotation amount until rotation of the valve cover is restricted by a rotation restricting portion provided in the housing, and in a case where the rotation of the valve cover with respect to the housing is restricted by the rotation restricting portion, a posture of the valve body with respect to the fluid pipe is maintained in a predetermined posture.

In a case of putting the flow passage of the fluid pipe into a closed state by the sluice valve, the valve body is inserted into the fluid pipe, and a pressing force is applied to an elastic sealing member provided in the valve body, so that the elastic sealing member is elastically deformed and brought into close contact with an inner wall portion of the fluid pipe. Regarding a direction in which the elastic sealing member is elastically deformed, the elastic sealing member may be elastically deformed actively in a certain direction, and the elastic sealing member may be elastically deformed in any direction without being restricted to a certain direction.

In a case where the valve body is elastically deformed actively in a certain direction, it is desired that the posture of the valve body with respect to the fluid pipe is set to a predetermined posture (for example, a posture suitable for a direction in which the elastic sealing member is elastically deformed) in installing the sluice valve in the fluid pipe. In addition, even in a case where the elastic sealing member can be elastically deformed in any direction without being restricted to a certain direction, it is difficult to uniformly elastically deform the elastic sealing member in any direction. Therefore, in this case as well, it is preferable that the posture of the valve body with respect to the fluid pipe is set to a predetermined posture (posture suitable for closing the flow passage of the fluid pipe).

However, for example, in the attachment method described in Japanese Patent No. 3474003, the valve cover is attached to the valve cover mounting opening portion of the housing by screwing the housing-side screw portion and the valve cover-side screw portion, so that it is difficult to set a screwing amount to a constant amount or to manage the screwing amount. Therefore, in a case of installing the sluice valve in the fluid pipe, it is difficult to adjust the posture of the valve body with respect to the fluid pipe to a predetermined posture.

Therefore, with the present configuration, in the rotation step, a rotation amount in a case of rotating the valve cover with respect to the housing is set to a predetermined rotation amount until the rotation of the valve cover is restricted by the rotation restricting portion, and in a case where the rotation of the valve cover with respect to the housing is restricted by the rotation restricting portion, the posture of the valve body with respect to the fluid pipe is maintained in the predetermined posture. As a result, in the rotation step, by performing only a simple operation of rotating the valve cover with respect to the housing until the rotation of the valve cover is restricted by the rotation restricting portion, the posture of the valve body with respect to the fluid pipe can be set to the predetermined posture (for example, a posture suitable for the direction in which the elastic sealing member is elastically deformed or a posture suitable for closing the flow passage of the fluid pipe).

A fourth characteristic configuration of the present invention relates to a sluice valve installation structure used in the sluice valve installation method according to the first characteristic configuration described above, the sluice valve installation structure including: a housing-side bayonet claw portion, a claw insertion portion, and a fitting groove portion that are provided in a valve cover mounting opening portion of the housing, in which the housing-side bayonet claw portion and the claw insertion portions are each disposed in a plurality in a state in which mounting positions thereof are different from each other in a circumferential direction of the valve cover mounting opening portion of the housing, the fitting groove portion is provided in a state of being continuous with the claw insertion portion in an axial direction of the valve cover mounting opening portion and extending in the circumferential direction of the valve cover mounting opening portion of the housing, and a plurality of valve cover-side bayonet claw portions are provided on an outer peripheral portion of the valve cover in a state of being spaced apart from each other in a circumferential direction of the valve cover.

With the present configuration, since the housing-side bayonet claw portion, the claw insertion portion, and the valve cover-side bayonet claw portion are each provided in a plurality, in the insertion step, the valve cover can be inserted into the housing by inserting each of the plurality of valve cover-side bayonet claw portions through each of the plurality of claw insertion portions without interfering with each of the plurality of housing-side bayonet claw portions. In the rotation step, by rotating the valve cover with respect to the housing, each of the plurality of valve cover-side bayonet claw portions and each of the plurality of housing-side bayonet claw portions can be engaged with each other in a retaining manner in the valve body insertion direction. As a result, the valve cover can be suitably attached to the valve cover mounting opening portion of the housing while using a bayonet coupling structure including the plurality of valve cover-side bayonet claw portions and the plurality of housing-side bayonet claw portions.

In addition, since the fitting groove portion is provided in a state of being continuous with the claw insertion portion in the axial direction of the valve cover mounting opening portion in the housing and extending in the circumferential direction of the valve cover mounting opening portion of the housing, the valve cover-side bayonet claw portion can be continuously moved from the claw insertion portion to the fitting groove portion, and the insertion step and the rotation step can be smoothly performed in order.

A fifth characteristic configuration of the present invention is that a claw insertion fitting portion that is fitted into the claw insertion portion of the housing is provided in a covering body that covers a part of the valve cover, and the covering body is configured to be attached in a state of fitting the claw insertion fitting portion into the claw insertion portion so that the covering body is attachable in a rotation restricting state in which the claw insertion fitting portion abuts on the valve cover-side bayonet claw portion to restrict rotation of the valve cover.

With the present configuration, in the covering body attachment step, by only attaching the covering body in a state of fitting the claw insertion fitting portion into the claw insertion portion, the rotation restricting state is made in which the claw insertion fitting portion abuts on the valve cover-side bayonet claw portion to restrict the rotation of the valve cover, and the covering body attachment step can be easily performed.

A sixth characteristic configuration of the present invention is that a rotation restricting portion that restricts the rotation of the valve cover with respect to the housing includes an abutting wall portion that is capable of abutting on the valve cover-side bayonet claw portion that is rotationally moved in the fitting groove portion.

According to the present configuration, since the abutting wall portion abuts on the valve cover-side bayonet claw portion that is rotationally moved in the fitting groove portion, the rotation of the valve cover with respect to the housing can be restricted by the abutment. As a result, the rotation restricting portion need only include the abutting wall portion, and the rotation amount of the valve cover with respect to the housing can be appropriately restricted while simplifying the configuration.

A seventh characteristic configuration of the present invention is that the valve cover includes a valve cover-side guide groove portion that is engaged with a valve body-side guided portion of a valve body to guide the valve body in a valve body insertion direction, the housing includes a housing-side guide groove portion that is engaged with the valve body-side guided portion of the valve body to guide the valve body in the valve body insertion direction, in a case where the insertion step has been performed in the third step, a relative positional relationship between the housing-side guide groove portion, the valve cover-side guide groove portion, and the valve body-side guided portion becomes a non-interference state in which the housing-side guide groove portion, the valve cover-side guide groove portion, and the valve body-side guided portion do not interfere with each other, and in a case where the rotation step has been performed in the third step, a relative positional relationship between the valve cover-side guide groove portion and the housing-side guide groove portion becomes a continuous state in which the valve cover-side guide groove portion and the housing-side guide groove portion are continuous in the valve body insertion direction, and the valve body-side guided portion is engaged with the valve cover-side guide groove portion and the housing-side guide groove portion to be movable.

According to the present configuration, the valve body-side guided portion and the valve cover-side guide groove portion are engaged with each other, so that not only the valve body can be appropriately guided in the valve body insertion direction, but also relative rotation between the valve body and the valve cover can be prevented. As a result, in a case where a rotational operation force is applied to the valve operating shaft of the valve cover, the valve body can be appropriately guided in the valve body insertion direction while preventing inconvenience such as the valve body accidentally rotating with respect to the valve cover, and the valve body can be moved in the valve body insertion direction in a stable posture.

In the third step, the insertion step and the rotation step are performed in this order. However, in a case where the insertion step has been performed, when the housing-side guide groove portion, the valve cover-side guide groove portion, and the valve body-side guided portion are in interference with each other, the rotation of the valve cover is restricted by the abutment between the housing-side guide groove portion and the valve cover-side guide groove portion or the valve body-side guided portion, and the rotation step of rotating the valve cover with respect to the housing cannot be performed. Therefore, in the present configuration, in a case where the insertion step has been performed in the third step, the relative positional relationship between the housing-side guide groove portion, the valve cover-side guide groove portion, and the valve body-side guided portion is set to a non-interference state in which they do not interfere with each other. As a result, the rotation step can be appropriately performed without the housing-side guide groove portion and the valve cover-side guide groove portion or the valve body-side guided portion abutting on each other.

In addition, with the present configuration, in a case where the rotation step has been performed in the third step, the relative positional relationship between the valve cover-side guide groove portion and the housing-side guide groove portion is set to a continuous state in which the valve cover-side guide groove portion and the housing-side guide groove portion are continuous in the valve body insertion direction, and the valve body-side guided portion is engaged with the valve cover-side guide groove portion and the housing-side guide groove portion to be movable. Therefore, the sluice valve can be installed in a state of appropriately guiding the valve body in the valve body insertion direction. Therefore, in a case of inserting the valve body into the fluid pipe, the valve body-side guided portion is engaged with the valve cover-side guide groove portion and the housing-side guide groove portion, so that the valve body can be inserted into the fluid pipe while maintaining a constant posture without changing the posture of the valve body. Therefore, as described above, in a case where the posture of valve body with respect to the fluid pipe is set to a predetermined posture (for example, a posture suitable for a direction in which the elastic sealing member is elastically deformed or a posture suitable for closing the flow passage of the fluid pipe), the valve body can be inserted into the fluid pipe while appropriately maintaining the predetermined posture, and the flow passage of the fluid pipe can be easily and reliably closed.

DESCRIPTION OF THE INVENTION

An embodiment of a sluice valve installation method and a sluice valve installation structure used in the sluice valve installation method according to the present invention will be described with reference to the accompanying drawings.

Figure 1:
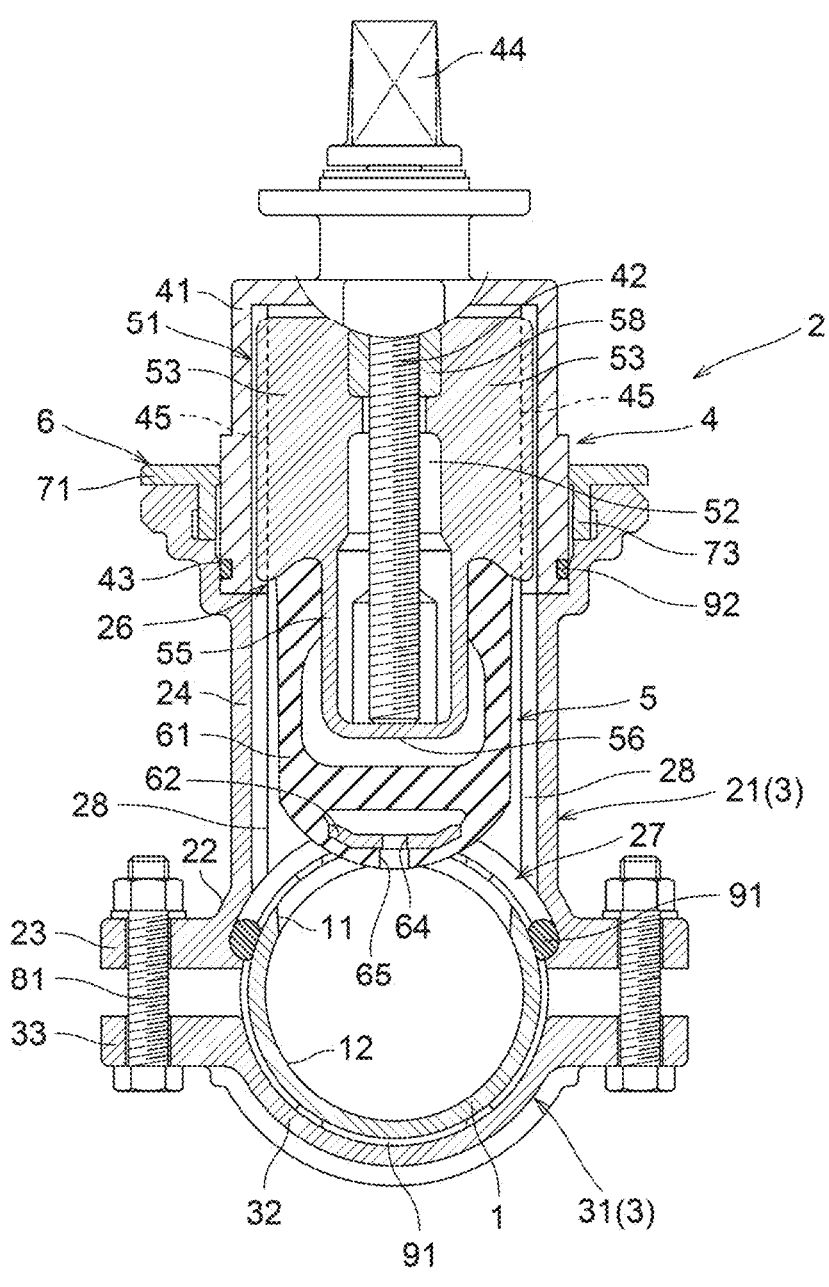
FIG. 1 is a vertical sectional view of a fluid pipe and a sluice valve in a direction perpendicular to a pipe axial direction of the fluid pipe.
Figure 2:
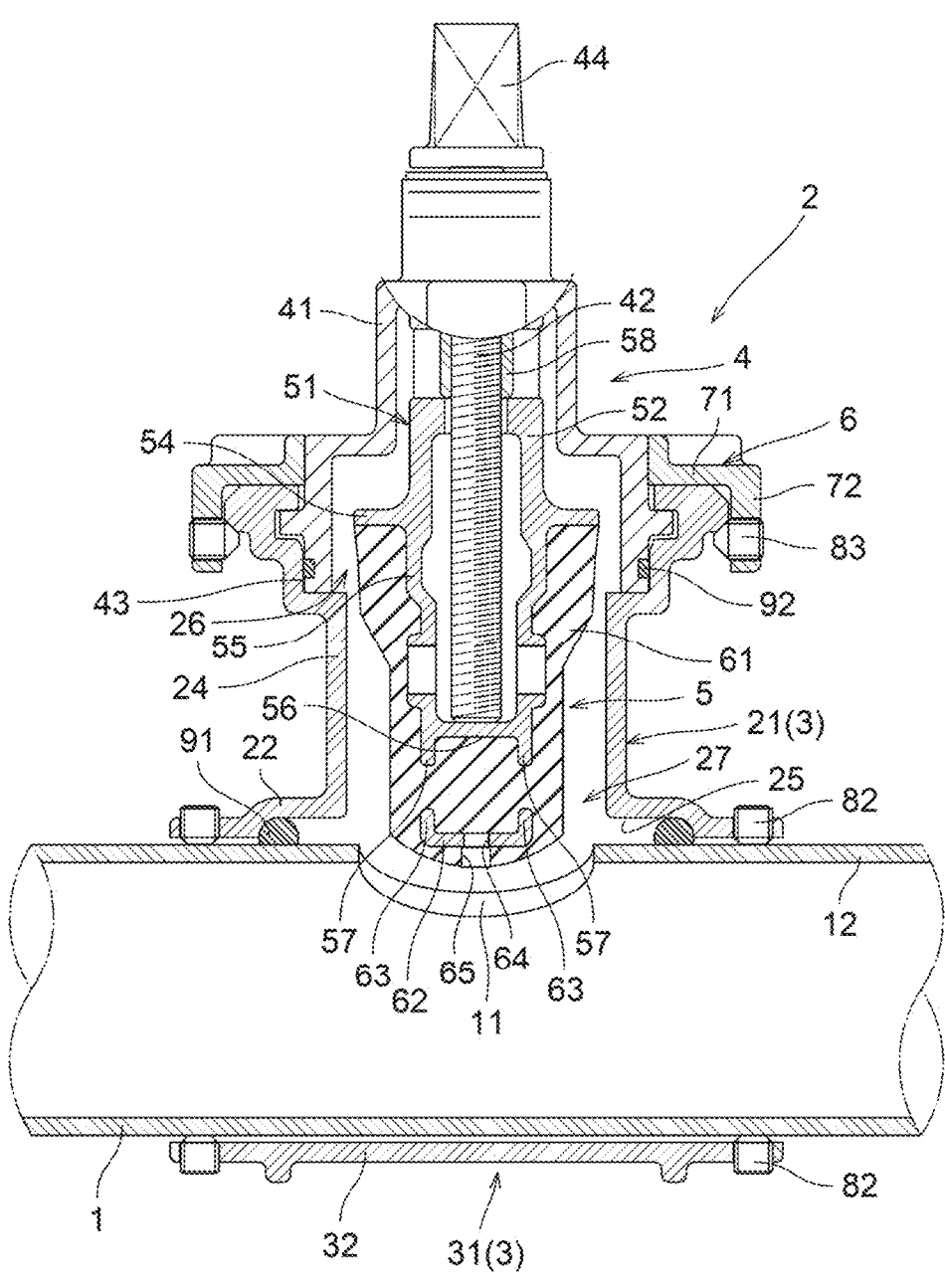
FIG. 2 is a vertical sectional view of the fluid pipe and the sluice valve in the pipe axial direction of the fluid pipe.

As shown in FIGS. 1 and 2, this sluice valve installation method is a method of installing a sluice valve 2 which is capable of opening and closing a flow passage of a fluid pipe 1 (for example, a water pipe), in the fluid pipe 1 in an uninterrupted flow state. Hereinafter, first, the sluice valve 2 in a state of being installed in the fluid pipe 1 will be described. Here, the description will be made while a pipe axial direction of the fluid pipe 1 is referred to as a "first direction", and a radial direction of the fluid pipe 1 perpendicular to the pipe axial direction of the fluid pipe 1 is referred to as a "second direction".

Figure 3:
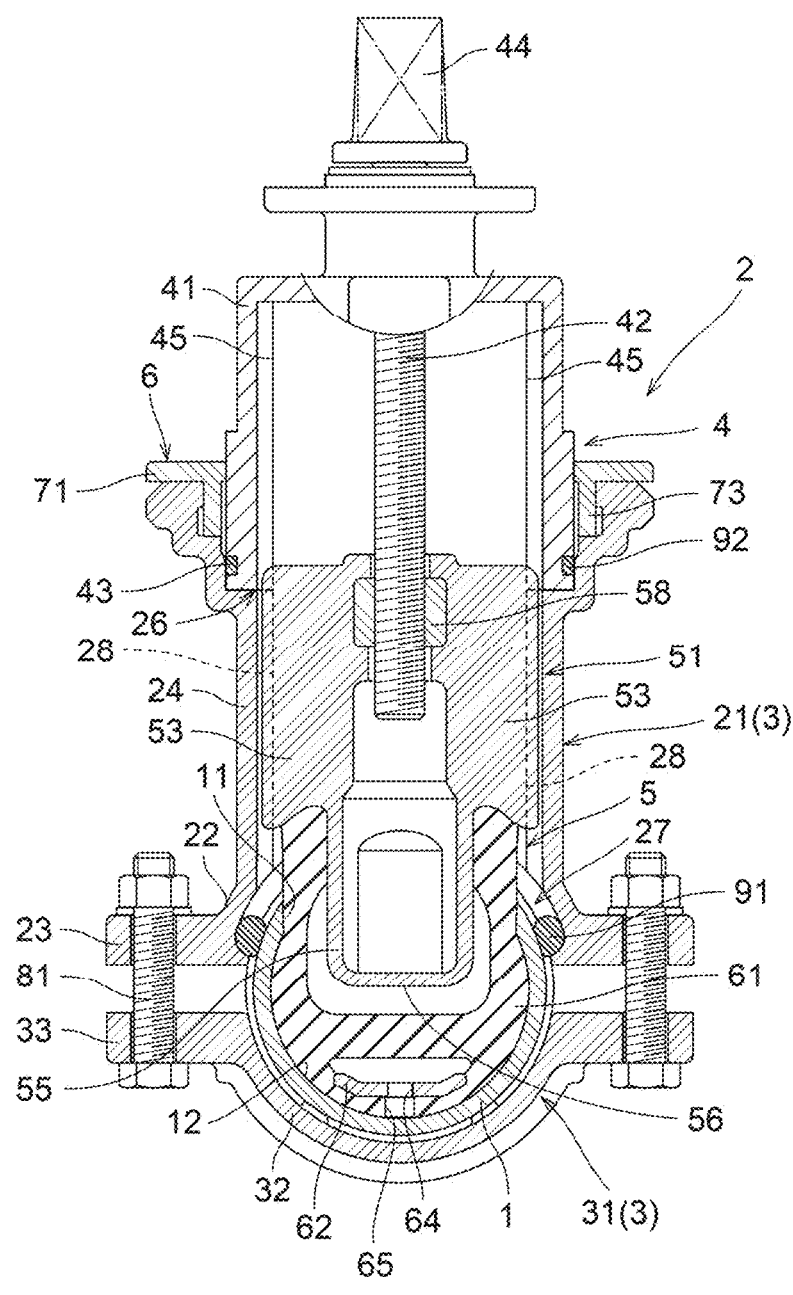
FIG. 3 is a vertical sectional view of the fluid pipe and the sluice valve in the direction perpendicular to the pipe axial direction of the fluid pipe in a case where the sluice valve is in a closed state.

As shown in FIGS. 1 and 2, the sluice valve 2 includes a housing 3 that is attached to an outer peripheral portion of the fluid pipe 1, a valve body 5 that can be inserted into the fluid pipe 1 through a through-hole 11 formed in the fluid pipe 1, and a valve cover 4 incorporating the valve body 5. As shown in FIG. 3, the sluice valve 2 is in a closed state in which a flow of fluid (for example, water) in the fluid pipe 1 is blocked by inserting the valve body 5 into the fluid pipe 1 in a valve body insertion direction (downward side in an up-down direction in FIG. 3) and elastically deforming an elastic sealing member 61 provided in the valve body 5 to bring the elastic sealing member 61 into close contact with an inner wall portion 12 of the fluid pipe 1.

As shown in FIGS. 1 and 2, the housing 3 adopts a split structure of a first split body 21 and a second split body 31 that are fixed to the fluid pipe 1. The first split body 21 and the second split body 31 are provided in a state of sandwiching the fluid pipe 1 in the second direction (up-down direction in FIGS. 1 and 2). Incidentally, in a case where the split structure is adopted as the housing 3, the number of split bodies can be changed as appropriate and can be three or more. In addition, the housing 3 can be implemented without adopting the split structure.

As shown in FIGS. 1 and 2, the first split body 21 includes a first proximal end portion 22 that surrounds substantially half (upper half) of the outer peripheral portion of the fluid pipe 1, a first flange portion 23 that extends outward from the first proximal end portion 22, and a housing cylindrical portion 24 that extends from the first proximal end portion 22 in the second direction (upward side in FIGS. 1 and 2). One end portion (lower end portion) of the housing cylindrical portion 24 acts as a fluid pipe connection opening portion 27 that is connected to the fluid pipe 1, and the other end portion (upper end portion) of the housing cylindrical portion 24 acts as a valve cover mounting opening portion 26 on which the valve cover 4 is mounted.

As shown in FIGS. 1 and 2, the second split body 31 includes a second proximal end portion 32 that surrounds substantially half (lower half) of the outer peripheral portion of the fluid pipe 1 and a second flange portion 33 that extends outward from the second proximal end portion 32.

As shown in FIG. 1, the first split body 21 and the second split body 31 are fixedly connected to each other in a state of sandwiching the fluid pipe 1 by fastening the first flange portion 23 and the second flange portion 33 by a fastening tool 81 such as a bolt and a nut. As shown in FIG. 2, set screws 82 are screwed into both end portions of the first proximal end portion 22 and the second proximal end portion 32 in the first direction (left-right direction in FIG. 2) to extend through the first proximal end portion 22 or the second proximal end portion 32 and abut on an outer wall portion of the fluid pipe 1, and the first split body 21 and the second split body 31 are positioned with respect to the fluid pipe 1 by the set screws 82.

As shown in FIG. 2, a first recessed portion 25 that holds a ring-shaped first rubber packing 91 is formed in the first proximal end portion 22 on an inner side with respect to a mounting location of the set screw 82 in the first direction (left-right direction in FIG. 2). A portion between an inner wall portion of the first proximal end portion 22 and the outer wall portion of the fluid pipe 1 is watertightly sealed by the first rubber packing 91, and the first split body 21 of the housing 3 is provided in a sealed state (watertight state) on the fluid pipe 1.

As shown in FIGS. 1 and 2, the valve cover 4 includes a valve cover main body portion 41 incorporating the valve body 5, and a valve operating shaft 42 for operating the valve body 5. The valve cover main body portion 41 is formed in a tubular shape extending in the second direction (up-down direction in FIGS. 1 and 2), and the valve body 5 is supported to be movable in the second direction. A connection-side end portion (lower end portion) of the valve cover main body portion 41 is mounted on the housing cylindrical portion 24 in a state of being fitted in the valve cover mounting opening portion 26 of the housing cylindrical portion 24 in the first split body 21, and the valve cover mounting opening portion 26 of the housing cylindrical portion 24 is closed by the valve cover main body portion 41. An annular recessed portion 43 that holds a ring-shaped second rubber packing 92 is formed on an outer peripheral portion of the connection-side end portion of the valve cover main body portion 41. A portion between an outer wall portion of the connection-side end portion of the valve cover main body portion 41 and an inner wall portion of the valve cover mounting opening portion 26 of the housing cylindrical portion 24 is watertightly sealed by the second rubber packing 92, and the valve cover 4 is provided in a sealed state (watertight state) on the housing 3 (first split body 21).

As shown in FIGS. 1 and 2, the valve operating shaft 42 is disposed in a state of penetrating the inside of the valve cover main body portion 41 in the second direction (up-down direction in FIGS. 1 and 2), and a portion that protrudes upward of the valve cover main body portion 41 is covered with a key cap 44. The valve body 5 is connected to a lower end portion of the valve operating shaft 42, and a nut 58 provided in a non-rotatable state in the valve body 5 is screwed to the valve operating shaft 42. As a result, the valve body 5 can be operated to be movable in the second direction (up-down direction in FIGS. 1 and 2) by rotationally operating the valve operating shaft 42.

Figure 11A:
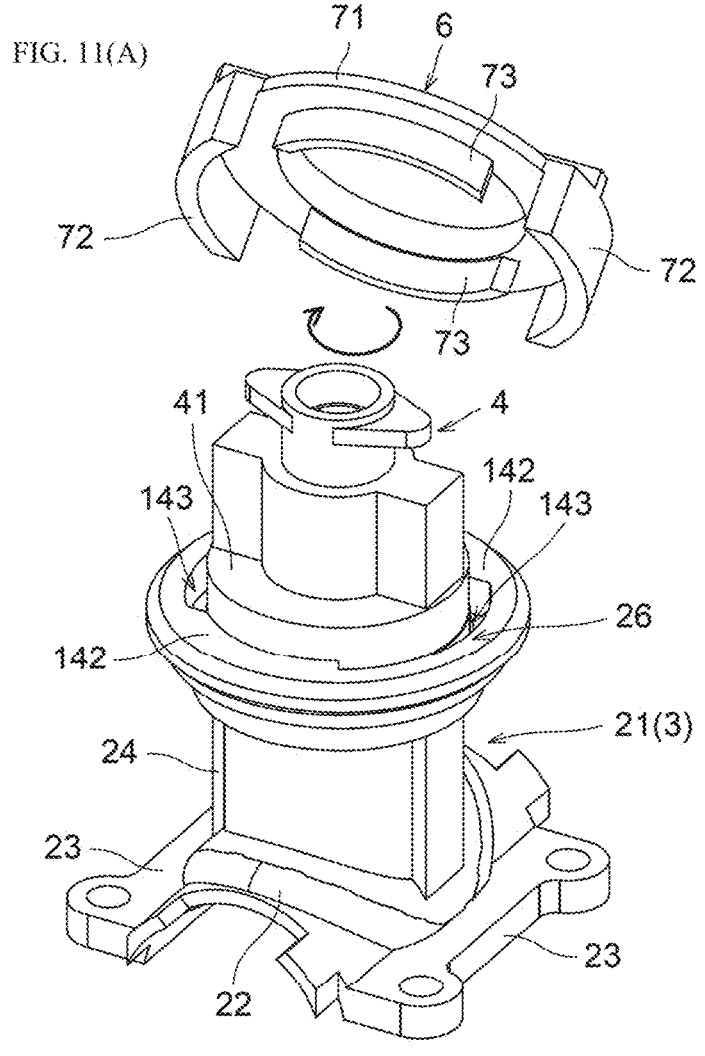
FIG. 11(A) is a perspective view showing the housing and the valve cover in a state in which the rotation step has been performed.

A valve cover fixing member 6 (corresponding to a covering body) that covers at least a part of the valve cover 4 is disposed on an outer side (upper side) of the valve cover 4 in the second direction (up-down direction in FIGS. 1 and 2). As shown in FIG. 11(A), the valve cover fixing member 6 includes a covering portion 71 that covers an upper portion of the valve cover 4, and a downward extending portion 72 that extends downward from an outer end portion of the covering portion 71.

As shown in FIG. 11(A), the covering portion 71 is formed in a ring shape that covers, except for a portion that protrudes upward in an upper portion of the valve cover 4, a periphery of the protruding portion. As shown in FIG. 2, a set screw 83 is screwed into a screw hole portion formed in the downward extending portion 72 to fix the valve cover fixing member 6. The valve cover fixing member 6 is disposed such that the covering portion 71 covers the upper portion of the valve cover 4, and the set screw 83 is fastened in a state of abutting on an outer wall portion of the first split body 21, thereby fixing the valve cover 4 in a state of being sandwiched between the valve cover fixing member 6 and the first split body 21.

As shown in FIGS. 1 and 2, the valve body 5 includes a valve main body 51 made of metal, and an elastic sealing member 61 (for example, an elastic rubber, resin, or the like) that is disposed at a site (lower site) of the valve main body 51 close to the fluid pipe 1.

As shown in FIGS. 1 and 2, the valve main body 51 includes a block-shaped portion 52 that is disposed on a proximal end side (upper side in FIGS. 1 and 2) of the valve main body 51, a pair of plate-shaped engagement pieces 53 (see FIG. 1) that are outwardly projected from an outer surface of the block-shaped portion 52 in a posture along the second direction, a flange-shaped portion 54 (see FIG. 2) that is formed in a region surrounding the outer surface of the block-shaped portion 52, and a holding portion 55 that extends from the flange-shaped portion 54 to a distal end side (lower side in FIGS. 1 and 2) of the valve main body 51.

As shown in FIGS. 1 and 2, a distal end surface 56 having a flat surface shape is formed at an end portion of the holding portion 55 in an extending direction, and as shown in FIG. 2, a holding portion-side restricting wall portion 57 protruding in the extending direction of the holding portion 55 is provided at both end portions of the distal end surface 56 in the first direction in a posture extending along a direction perpendicular to the first direction. The holding portion-side restricting wall portion 57 is provided in a pair to be parallel to each other while interposing the distal end surface 56 therebetween in the first direction.

As shown in FIGS. 1 and 2, a hole portion is formed at a central portion of the valve main body 51 extending from the block-shaped portion 52 to the holding portion 55 on an inner side in the second direction (downward side in FIGS. 1 and 2), and the nut 58 is disposed on an upper end side of the hole portion in a non-rotatable state. The valve operating shaft 42 for operating the valve body 5 is inserted into the hole portion of the valve main body 51 in a state of being screwed into the nut 58.

As shown in FIGS. 1 and 2, the elastic sealing member 61 is provided in a state of covering a periphery of the holding portion 55 that is disposed at a lower site than the flange-shaped portion 54 in the valve main body 51. The elastic sealing member 61 has a predetermined thickness in a state of being expanded from the holding portion 55 to an outer side, and an outer peripheral surface thereof is formed as a contact surface that can come into contact with the inner wall portion 12 of the fluid pipe 1. Regarding the thickness of the elastic sealing member 61, for example, in a case where a thickness direction thereof is assumed as the first direction, a distal end side near the holding portion 55, a lateral portion, and the like have a substantially constant predetermined thickness, and a portion approaching the flange-shaped portion 54 on a proximal end side of the holding portion 55 has a thickness greater than the predetermined thickness.

As shown in FIGS. 1 and 2, a core material 62 is disposed inside the elastic sealing member 61 at a position facing the distal end surface 56 of the holding portion 55. The core material 62 is made of, for example, a material such as an iron material or a stainless material, which is harder than the elastic sealing member 61. The core material 62 is disposed at a position closer to an outer end portion of the elastic sealing member 61 than the distal end surface 56 of the holding portion 55 in the extending direction of the valve main body 51. As described above, the mounting position of the core material 62 is set such that a distance between an outer peripheral surface of the elastic sealing member 61 and an outer wall portion of the core material 62 is shorter than a distance between the distal end surface 56 of the holding portion 55 and an inner wall portion of the core material 62.

Regarding a shape of the core material 62, as shown in FIG. 1, as viewed in a direction along the first direction, an outer wall portion is formed in a curved shape in which a central portion protrudes to an outer side, and an inner wall portion is formed in a recessed shape in which a central portion is recessed. As shown in FIG. 2, a core material-side restricting wall portion 63 that protrudes to a side close to the holding portion-side restricting wall portion 57 is provided at a position facing the holding portion-side restricting wall portion 57 of the holding portion 55 in the inner wall portion of the core material 62. The core material-side restricting wall portion 63 extends in a direction perpendicular to the first direction. In the extending direction of the valve main body 51, a distance between the holding portion 55 and the core material 62 is shortened by the holding portion-side restricting wall portion 57 and the core material-side restricting wall portion 63 that face each other. As a result, the elastic sealing member 61 is more difficult to elastically deform than other portions, and the elastic deformation of the elastic sealing member 61 in the first direction is suppressed.

As shown in FIGS. 1 and 2, the elastic sealing member 61 is molded by a mold in a form in which the core material 62 is inserted. A core material-side hole portion 64 into which a positioning pin or the like is inserted during molding is formed in the core material 62, and a sealing member-side hole portion 65 into which a positioning pin or the like is inserted is also formed in a distal end portion of the elastic sealing member 61.

Although not shown, a slit groove portion is formed on the outer peripheral surface of the elastic sealing member 61 at a position corresponding to an intermediate portion between the distal end surface 56 of the holding portion 55 and the core material 62. As shown in FIGS. 1 and 2, the elastic sealing member 61 is not entirely adhered to the holding portion 55 or the like. A gap is formed in a part of an outer wall portion along the first direction or the distal end surface 56 in the holding portion 55, so that the elastic sealing member 61 is not adhered to the holding portion 55. In this way, the elastic sealing member 61 includes a site that forms the slit groove portion and is not adhered to the holding portion 55 or the like, so that the elastic sealing member 61 is easily elastically deformed in a case where a compressive force is applied to the elastic sealing member 61.

A case where the sluice valve 2 is switched from an open state to a closed state will be described.

FIGS. 1 and 2 show an open state of the sluice valve 2 before the valve body 5 is inserted into the fluid pipe 1. FIG. 3 shows a closed state of the sluice valve 2 in which valve body 5 is inserted into the fluid pipe 1.

From the open state shown in FIGS. 1 and 2, the valve operating shaft 42 is rotationally operated to move the valve body 5 in the valve body insertion direction (downward side in FIGS. 1 and 2) so that the valve body 5 is inserted into the fluid pipe 1 through the through-hole 11, and the outer peripheral surface of the elastic sealing member 61 is brought into contact with the inner wall portion 12 of the fluid pipe 1. In this contact state, by further rotationally operating the valve operating shaft 42, a compressive force for compressing the elastic sealing member 61 in the valve body insertion direction is applied. As a result, the elastic sealing member 61 is elastically deformed to bring the outer peripheral surface of the elastic sealing member 61 into close contact with the inner wall portion 12 of the fluid pipe 1.

In this case, since the outer wall portion of the core material 62 is formed in a curved shape in which the central portion protrudes to the outer side, the outer wall portion of the core material 62 has a shape along the inner wall portion 12 of the fluid pipe 1. Therefore, a compressive force can be uniformly applied to a site between the core material 62 and the inner wall portion 12 of the fluid pipe 1 in the elastic sealing member 61, and the elastic sealing member 61 can be elastically deformed as uniformly as possible while suppressing local large elastic deformation.

In addition, since the core material 62 is displaced in a direction approaching the distal end surface 56 of the holding portion 55, a compressive force is applied to the elastic sealing member 61 between the distal end surface 56 of the holding portion 55 and the core material 62, and the elastic sealing member 61 is elastically deformed in a form of swelling in a direction perpendicular to the valve body insertion direction. Moreover, as viewed in the valve body insertion direction, the elastic sealing member 61 is preferentially elastically deformed in a direction (the second direction, the radial direction of the fluid pipe 1) approaching the inner wall portion 12 of the fluid pipe 1 perpendicular to the valve body insertion direction while suppressing the elastic deformation of the elastic sealing member 61 to the first direction (pipe axial direction of the fluid pipe 1) perpendicular to the valve body insertion direction by the pair of holding portion-side restricting wall portions 57 and the pair of core material-side restricting wall portions 63.

In this way, the sluice valve 2 elastically deforms the elastic sealing member 61 actively in the second direction (radial direction of the fluid pipe 1) perpendicular to the valve body insertion direction of the valve body 5 by the holding portion-side restricting wall portion 57, the core material-side restricting wall portion 63, and the like. Therefore, the elastic sealing member 61 can be brought into close contact with an entire circumference of the inner wall portion 12 of the fluid pipe 1, and the flow passage of the fluid pipe 1 can be put into the closed state. The sluice valve 2 includes an elastic deformation direction defining portion that defines a direction in which the elastic sealing member 61 is elastically deformed to the second direction (radial direction of the fluid pipe 1) perpendicular to the valve body insertion direction of the valve body 5, and the elastic deformation direction defining portion is configured by the holding portion-side restricting wall portion 57, the core material-side restricting wall portion 63, and the like.

In the sluice valve 2 having the elastic deformation direction defining portion, the elastic sealing member 61 is elastically deformed actively in an elastic deformation direction defined by the elastic deformation direction defining portion. Therefore, the elastic sealing member 61 is easily brought into close contact with the inner wall portion 12 of the fluid pipe 1 in the defined direction. Hence, for example, even in a case where the fluid pipe 1 has a large opening diameter and it is difficult to bring the flow passage of the fluid pipe 1 into a closed state, the elastic sealing member 61 can be appropriately brought into close contact with the entire circumference of the inner wall portion 12 of the fluid pipe 1, thereby putting the flow passage of the fluid pipe 1 into a closed state appropriately by installing the sluice valve 2 having the elastic deformation direction defining portion such that a posture of the valve body 5 with respect to the fluid pipe 1 is a predetermined posture (for example, a posture along the radial direction of the fluid pipe 1 perpendicular to the pipe axial direction of the fluid pipe 1).

In a case where the sluice valve 2 is switched from the open state to the closed state, the valve body 5 is moved in the valve body insertion direction (downward side in FIGS. 1 and 3) so as to transition from FIG. 1 to FIG. 3. In this case, when the posture of the valve body 5 is unstable or a movement direction of the valve body 5 deviates from the valve body insertion direction, it may be difficult to appropriately put the flow passage of the fluid pipe 1 into the closed state. Therefore, in this embodiment, the valve body 5 is provided with a guide mechanism that guides the valve body 5 in the valve body insertion direction.

As shown in FIGS. 1 and 3, the guide mechanism includes a pair of engagement pieces 53 that are projected outward in a posture along the second direction in the valve body 5, a valve cover-side guide groove portion 45 that is engaged with the engagement pieces 53 of the valve body 5 to guide the valve body 5 in the valve body insertion direction, and a housing-side guide groove portion 28 that is engaged with the engagement pieces 53 of the valve body 5 to guide the valve body 5 in the valve body insertion direction. The valve cover-side guide groove portion 45 is disposed on an inner wall portion of the valve cover main body portion 41 of the valve cover 4, and the housing-side guide groove portion 28 is disposed on an inner wall portion of the housing cylindrical portion 24 of the first split body 21. The valve cover-side guide groove portion 45 and the housing-side guide groove portion 28 are provided in a state of being continuous in the valve body insertion direction, and the engagement pieces 53 of the valve body 5 are engaged with the valve cover-side guide groove portion 45 and the housing-side guide groove portion 28 to guide the valve body 5 in the valve body insertion direction.

(Sluice Valve Installation Method)

Hereinafter, a sluice valve installation method of installing the sluice valve 2 in the fluid pipe 1 will be described with reference to FIGS. 4(A)-(C), 5(A)-5(B), 6(A)-6(B), 7(A)-7(B), 8(A)-8(C), 9, 10(A)-10(B), 11(A)-11(B), and 12(A)-12(C).

Figure 4C:
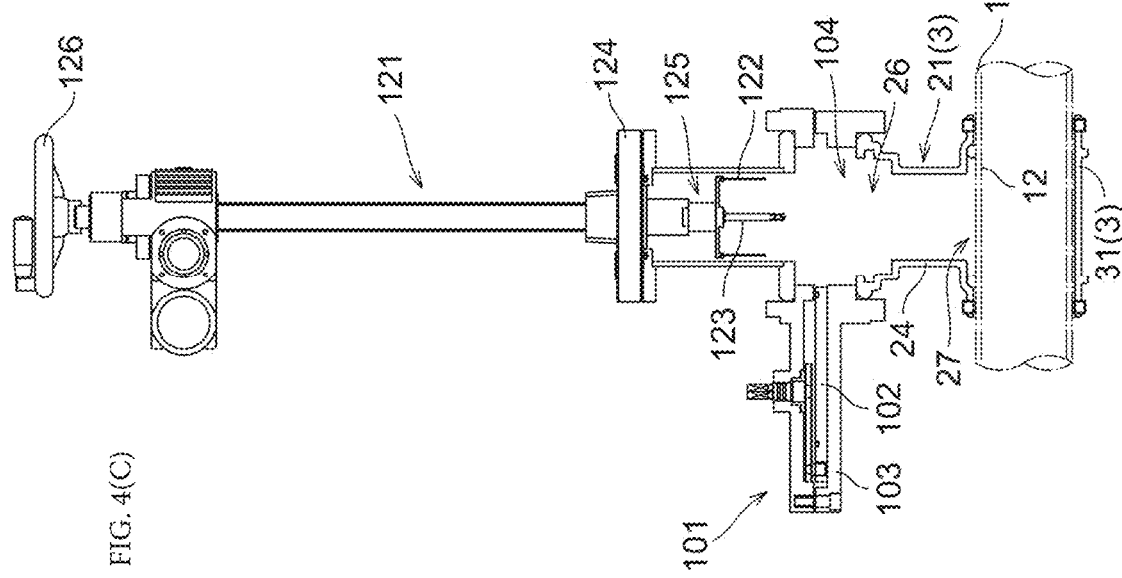
FIG. 4(C) is a diagram showing a work valve attachment step in the first step.
Figure 4A:
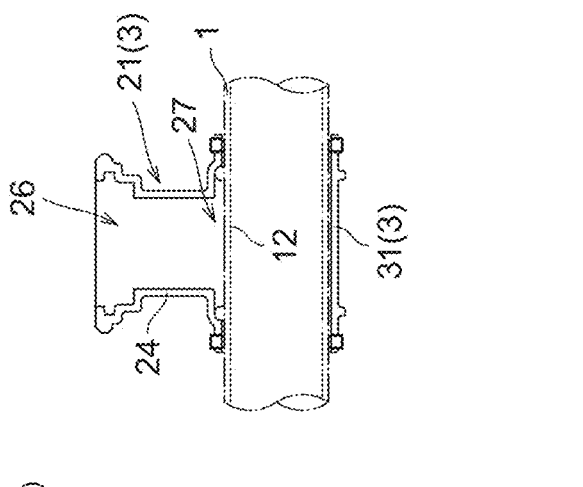
FIG. 4(A) is a diagram showing a housing attachment step in a first step.
Figure 4B:
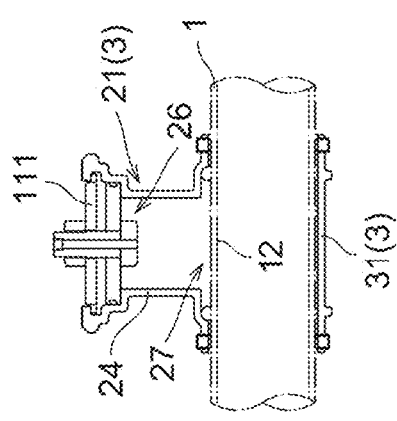
FIG. 4(B) is a diagram showing a state in which a hydraulic test of a housing cylindrical portion is performed in the first step.
Figure 5B:
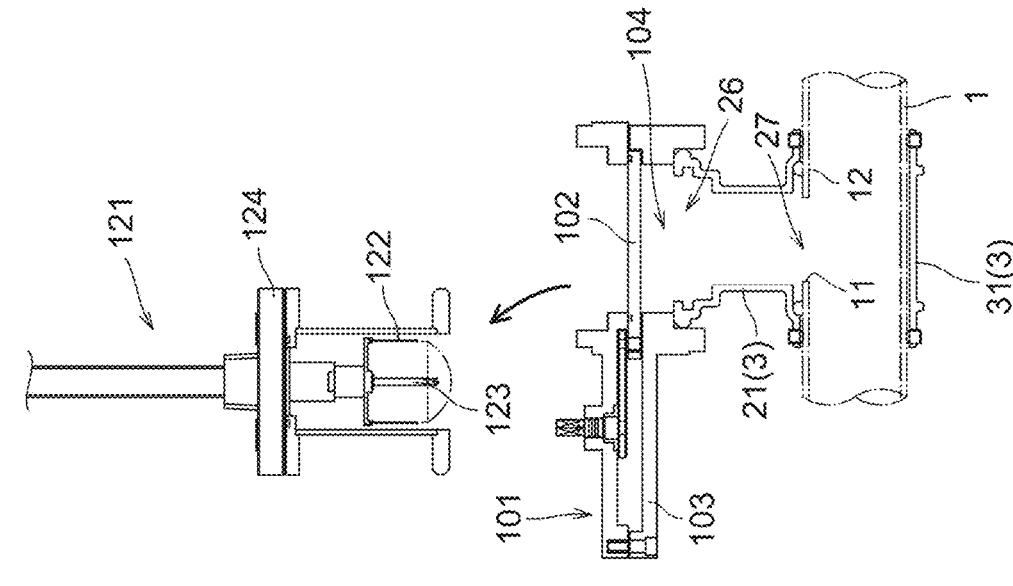
FIG. 5(B) is a diagram showing a state in which a perforating device is removed in the second step.
Figure 5A:
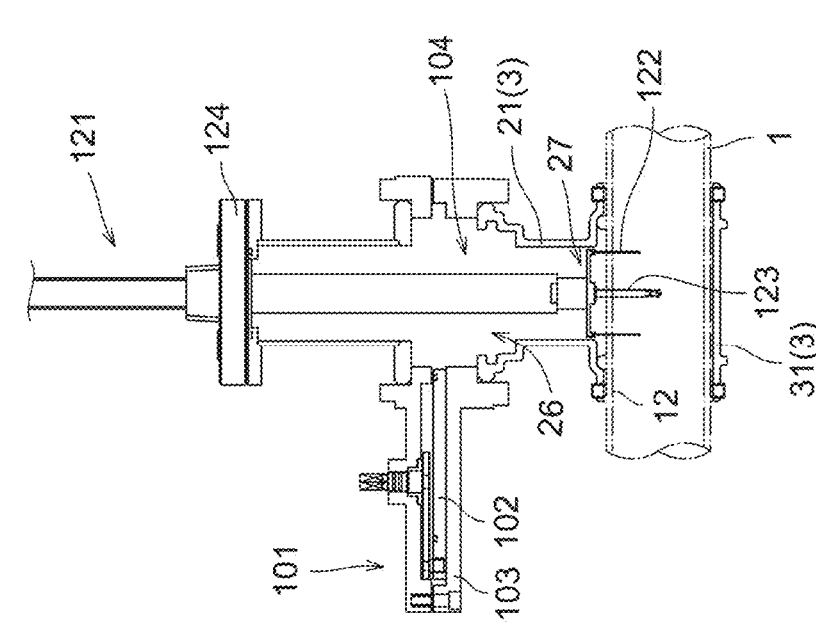
FIG. 5(A) is a diagram showing a state in which the fluid pipe is perforated in a second step.

In this sluice valve installation method, the following steps are performed in order: a first step of attaching the housing 3 of the sluice valve 2 and a work valve 101 capable of opening and closing the valve cover mounting opening portion 26 of the housing 3 to the fluid pipe 1 as shown in FIGS. 4(A)-4(C); a second step of opening and closing the work valve 101 to perforate the fluid pipe 1 to form the through-hole 11 through the valve cover mounting opening portion 26 of the housing 3 as shown in FIGS. 5(A) and 5(B); and a third step of opening and closing the work valve 101 to attach the valve cover 4 to the housing 3 in a state in which the valve body 5 of the sluice valve 2 is insertable into the fluid pipe 1 through the through-hole 11 of the fluid pipe 1 as shown in FIGS. 7(A), 7(B), and 8(A)-8(C) are performed in this order.

(First Step)

In the first step, as shown in FIGS. 4(A)-4(C), a housing attachment step of attaching the housing 3 of the sluice valve 2 to the fluid pipe 1 and a work valve attachment step of attaching the work valve 101 to the housing 3 are performed.

In the housing attachment step, as shown in FIG. 4(A), the housing 3 including the first split body 21 and the second split body 31 is attached to the outer peripheral portion of the fluid pipe 1 in a state in which the fluid pipe connection opening portion 27 in the housing cylindrical portion 24 of the first split body 21 is connected to the fluid pipe 1. After the attachment of the housing 3 is completed, as shown in FIG. 4(B), a hydraulic tool 111 is mounted to the valve cover mounting opening portion 26 in the housing cylindrical portion 24 of the first split body 21 to perform a hydraulic test on the housing cylindrical portion 24 in the first split body 21.

In the work valve attachment step, as shown in FIG. 4(C), the work valve 101 is attached to the valve cover mounting opening portion 26 in the housing cylindrical portion 24 of the first split body 21. The work valve 101 includes a work valve main body 102 that opens and closes the valve cover mounting opening portion 26, and a work valve housing 103 that accommodates the work valve main body 102 to be movable in a direction perpendicular to an axial direction of the valve cover mounting opening portion 26. The work valve housing 103 is attached to the first split body 21 in a sealed state in which a connection opening portion 104 inside the work valve housing 103 and the valve cover mounting opening portion 26 in the housing cylindrical portion 24 are sealed. The work valve 101 can open and close the valve cover mounting opening portion 26 by operating the work valve main body 102 to move in a direction perpendicular to the axial direction of the valve cover mounting opening portion 26 between a closed valve position inside the connection opening portion 104 and an open valve position outside the connection opening portion 104 (see FIG. 5(B) and the like).

In the work valve attachment step, as shown in FIG. 4(C), a perforating device 121 is also attached together with the attachment of the work valve 101. The perforating device 121 includes a hole saw 122 having a cylindrical shape, a center drill 123 that is disposed at a center of the hole saw 122, a perforating device main body portion 124 that accommodates the hole saw 122, the center drill 123, and the like, and an operation handle 126 for operating the hole saw 122 and the center drill 123. The perforating device main body portion 124 is attached to the work valve housing 103 in a sealed state in which a perforating device connection opening portion 125 inside the perforating device main body portion 124 and the connection opening portion 104 of the work valve housing 103 are sealed.

(Second Step)

Figure 6B:
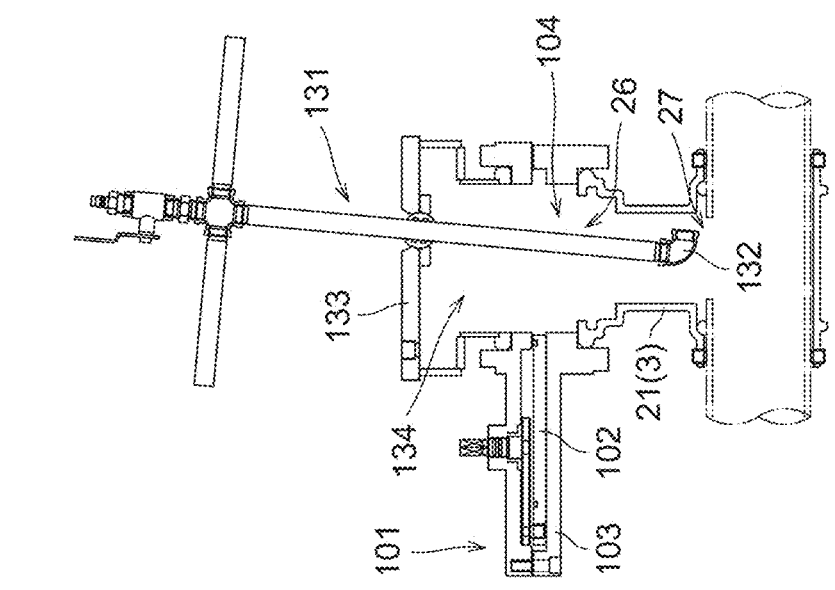
FIGS. 6(A) and 6(B) are diagrams showing a cleaning step in the second step.
Figure 6A:
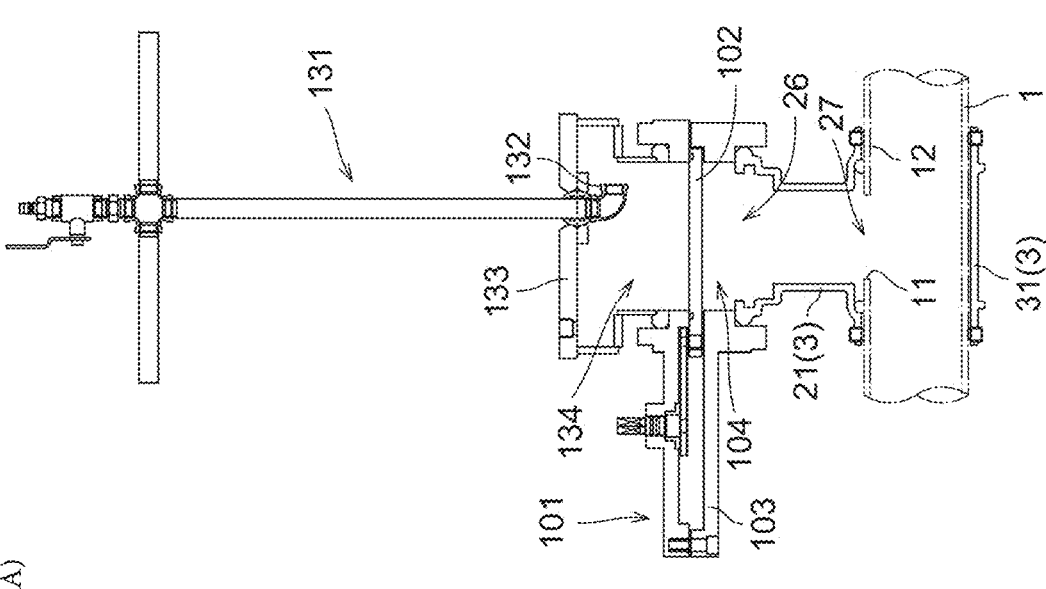

In the second step, a perforating step of perforating the fluid pipe 1 to form the through-hole 11 with the perforating device 121 as shown in FIGS. 5(A) and 5(B), and a cleaning step of cleaning the inside of the housing cylindrical portion 24 of the first split body 21 and the like as shown in FIGS. 6(A) and 6(B) are performed.

In the perforating step, as shown in FIG. 5(A), in a state in which the valve cover mounting opening portion 26 is opened by opening the work valve 101, the operation handle 126 (see FIG. 4(C) is operated to insert the hole saw 122 and the center drill 123 into the housing cylindrical portion 24 from an initial position, and the hole saw 122 and the center drill 123 are pressed against the outer wall portion of the fluid pipe 1 while being rotated, thereby forming the through-hole 11 penetrating the wall portion of the fluid pipe 1. After the perforation of the through-hole 11 is completed, as shown in FIG. 5(B), the operation handle 126 is operated to separate the hole saw 122 and the center drill 123 from the inside of the housing cylindrical portion 24 to be returned the initial position while hooking sliced pieces or the like generated by the perforation on the center drill 123, and the valve cover mounting opening portion 26 is put into a closed state to close the work valve 101. Thereafter, the perforating device 121 is detached from the work valve 101, and the perforating device 121 is removed.

In the cleaning step, as shown in FIG. 6(A), a cleaning device 131 is attached to the work valve 101, and as shown in FIG. 6(B), the inside of the housing cylindrical portion 24 is cleaned by the cleaning device 131. The cleaning device 131 includes a suction portion 132 that sucks and removes foreign matters such as chips, and a cleaning device main body portion 133 that movably accommodates the suction portion 132. The cleaning device main body portion 133 is attached to the work valve housing 103 in a sealed state in which a cleaning device connection opening portion 134 inside the cleaning device main body portion 133 and the connection opening portion 104 of the work valve housing 103 are sealed.

In the cleaning step, as shown in FIG. 6(B), the work valve 101 is put into an open state to open the valve cover mounting opening portion 26, and the foreign matters such as chips in the housing cylindrical portion 24 are sucked and cleaned by the suction portion 132 by using water pressure inside the pipe while moving the suction portion 132, e.g., moving the suction portion 132 inward and outward or tilting the suction portion 132 with respect to the cleaning device main body portion 133, while checking the inside through a viewing window (not shown).

Figure 7B:
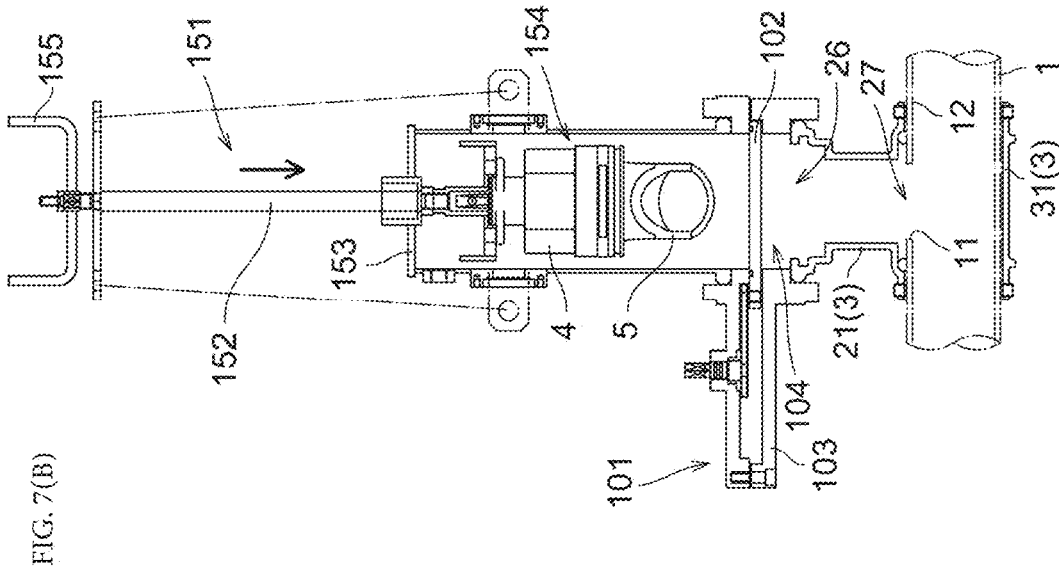
FIG. 7(B) is a diagram showing an insertion step in a third step.
Figure 7A:
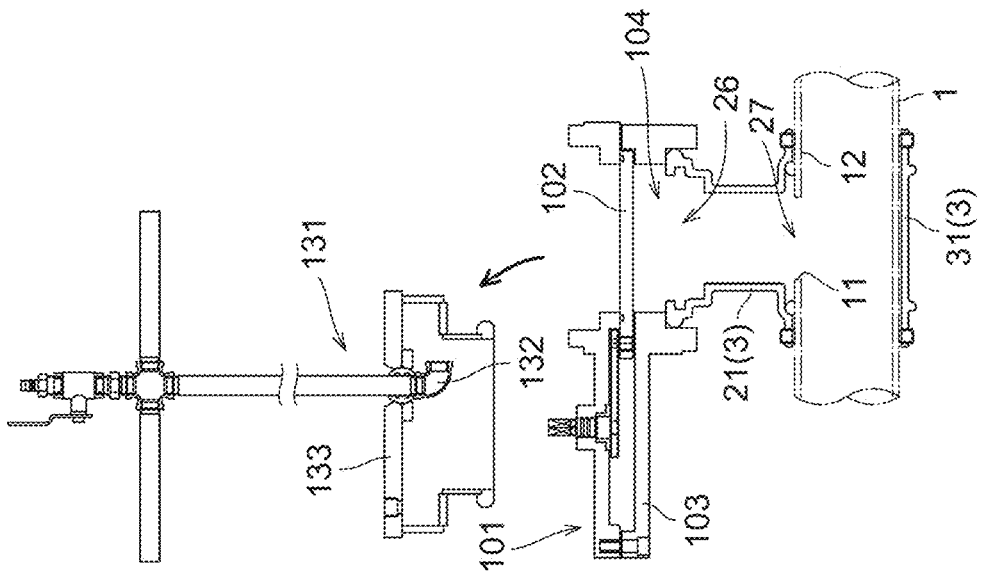
FIG. 7(A) is a diagram showing a state in which a cleaning device is removed in the second step.

When the cleaning of the inside of the housing cylindrical portion 24 is completed, as shown in FIG. 7(A), the work valve 101 is put into a closed state to close the valve cover mounting opening portion 26, and the cleaning device 131 is detached from the work valve 101 to remove the cleaning device 131.

(Third Step)

Figure 8C:
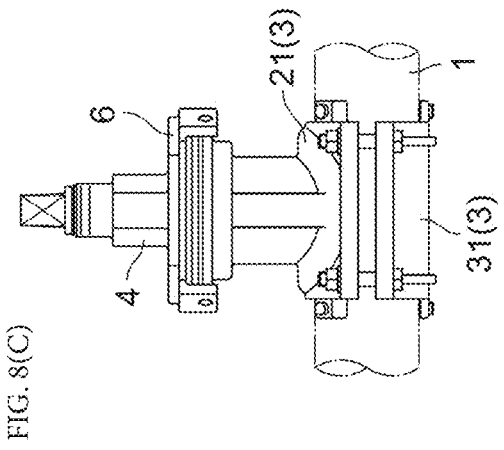
FIG. 8(C) is a diagram showing a valve cover fixing member attachment step in the third step.
Figure 8B:
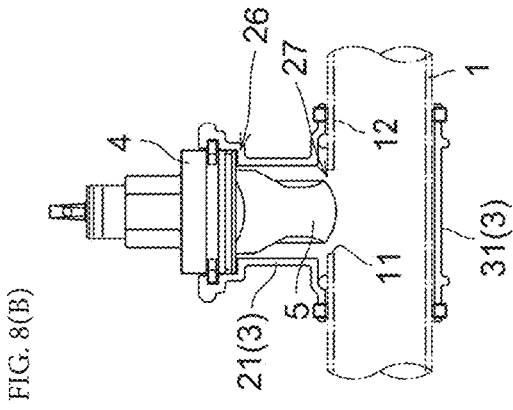
FIG. 8(B) is a diagram showing a state in which the rotation step in the third step has been performed.
Figure 8A:
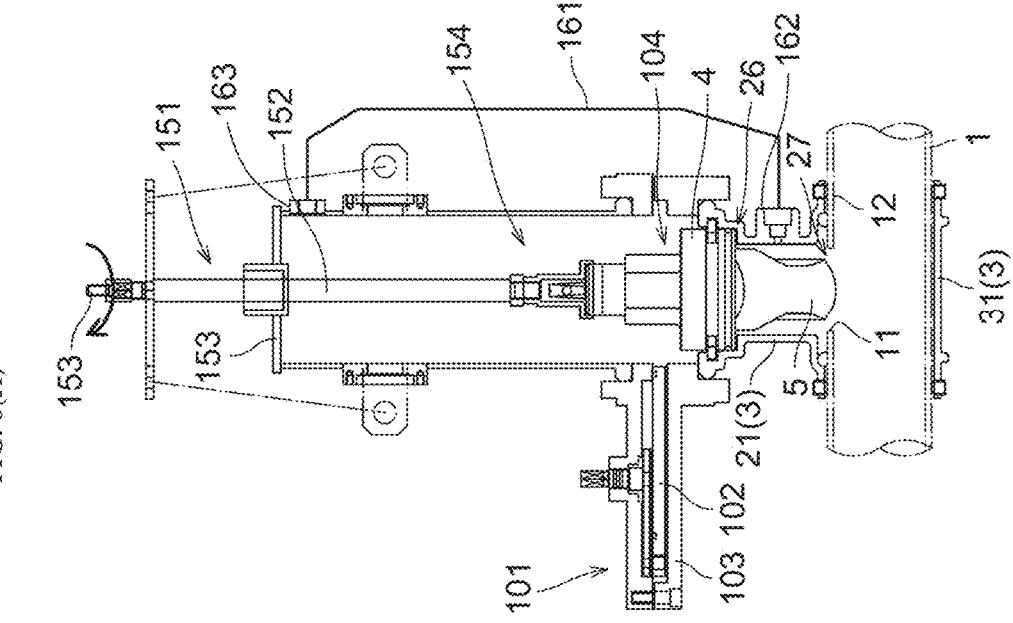
FIG. 8(A) is a diagram showing a rotation step in the third step.

In the third step, an insertion step of inserting the valve body 5 of the valve cover 4 into the valve cover mounting opening portion 26 in the housing cylindrical portion 24 of the first split body 21 as shown in FIG. 7(B), a rotation step of rotating the valve cover 4 with respect to the first split body 21 (housing 3) as shown in FIG. 8(A), and a valve cover fixing member attachment step (corresponding to a covering body attachment step) of attaching the valve cover fixing member 6 as shown in of FIG. 8(C) are performed.

(Insertion Step in Third Step)

In the insertion step, as shown in FIG. 7(B), first, an insertion device 151 is attached to the work valve 101 in a state where the valve cover 4 is assembled to the insertion device 151. The insertion device 151 includes an insertion shaft 152 to which the valve cover 4 is assembled, and an insertion device main body portion 153 that accommodates the valve cover 4 and the insertion shaft 152. The insertion device main body portion 153 is attached to the work valve housing 103 in a sealed state in which an insertion device connection opening portion 154 inside the insertion device main body portion 153 and the connection opening portion 104 of the work valve housing 103 are sealed.

After the attachment of the insertion device 151 is completed, as shown by an arrow in FIG. 7(B), an operation handle 155 connected to the insertion shaft 152 is operated to push the insertion shaft 152 and insert the valve body 5 of the valve cover 4 into the valve cover mounting opening portion 26.

Figure 9:
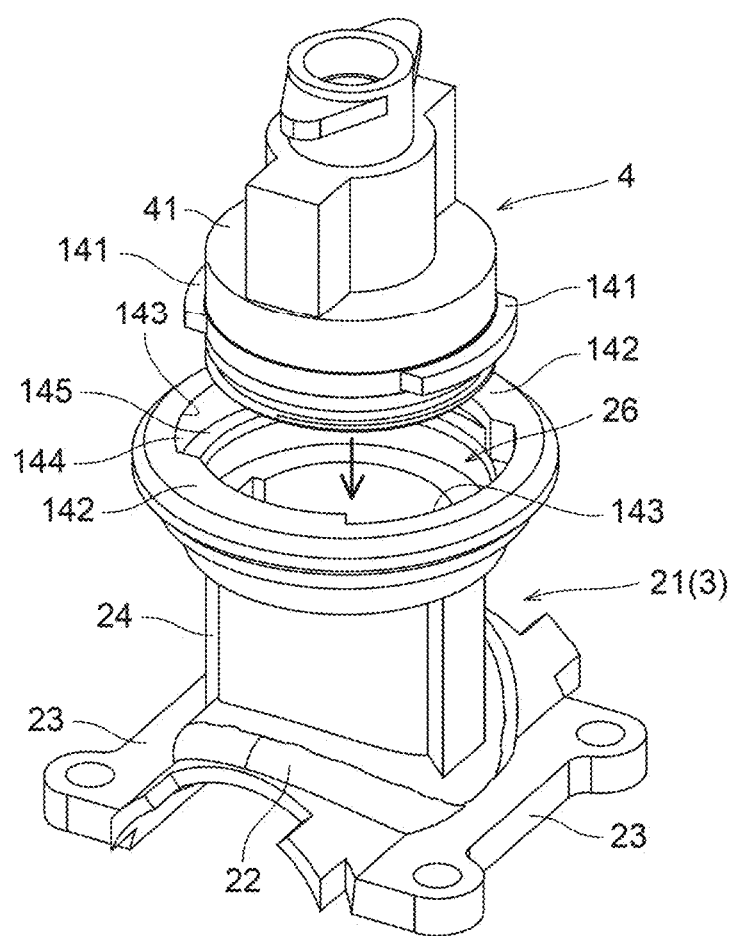
FIG. 9 is a perspective view showing a housing and a valve cover in the insertion step.

In this case, as shown in FIG. 9, a valve cover-side bayonet claw portion 141 is provided on the valve cover 4 side, and a housing-side bayonet claw portion 142 is provided on the housing 3 side. Thus, the valve cover-side bayonet claw portion 141 and the housing-side bayonet claw portion 142 interfere with each other depending on an insertion position of the valve cover 4 with respect to the housing 3, and the valve body 5 of the valve cover 4 cannot be inserted into the valve cover mounting opening portion 26. Therefore, in a case where the valve body 5 of the valve cover 4 is inserted into the valve cover mounting opening portion 26, the valve cover-side bayonet claw portion 141 is positioned at a valve cover attachment/detachment position where the valve cover-side bayonet claw portion 141 does not interfere with the housing-side bayonet claw portion 142.

As shown in FIG. 9, an outer shape of the valve cover main body portion 41 of the valve cover 4 is formed in a circular shape that is insertable into the valve cover mounting opening portion 26 having a circular shape in the housing cylindrical portion 24 of the first split body 21, and the valve cover-side bayonet claw portion 141 is provided on an outer peripheral portion of the valve cover main body portion 41 in a state of protruding to an outer side from the outer peripheral portion of the valve cover main body portion 41. The valve cover-side bayonet claw portion 141 is disposed in a pair at positions to face each other in a circumferential direction of the valve cover main body portion 41.

As shown in FIG. 9, the valve cover mounting opening portion 26 in the housing cylindrical portion 24 of the first split body 21 is provided with the housing-side bayonet claw portion 142 and a claw insertion portion 143. The housing-side bayonet claw portion 142 is provided in a state of protruding inward in the valve cover mounting opening portion 26, and the claw insertion portion 143 is provided as an insertion space into which the valve cover-side bayonet claw portion 141 is insertable. The housing-side bayonet claw portion 142 and the claw insertion portion 143 are disposed in a state in which mounting positions thereof are different from each other in a circumferential direction of the valve cover mounting opening portion 26. The housing-side bayonet claw portion 142 is disposed in a pair at positions facing each other in the circumferential direction of the valve cover mounting opening portion 26, and the claw insertion portion 143 is also disposed in a pair at positions facing each other in the circumferential direction of the valve cover mounting opening portion 26. The housing-side bayonet claw portion 142 and the claw insertion portion 143 are provided in a state of being alternately present in the circumferential direction of the valve cover mounting opening portion 26.

As shown in FIG. 9, the valve cover mounting opening portion 26 in the housing cylindrical portion 24 of the first split body 21 is provided with a fitting groove portion 144 into which the valve cover-side bayonet claw portion 141 can be fitted, in addition to the housing-side bayonet claw portion 142 and the claw insertion portion 143. The fitting groove portion 144 is disposed on an inner side with respect to the housing-side bayonet claw portion 142 and the claw insertion portion 143 in the axial direction of the valve cover mounting opening portion 26 (up-down direction in FIG. 9), and is provided in a state of being continuous with the claw insertion portion 143 in the axial direction of the valve cover mounting opening portion 26 and extending in the circumferential direction of the valve cover mounting opening portion 26.

As described above, since the valve cover-side bayonet claw portion 141, the housing-side bayonet claw portion 142, and the claw insertion portion 143 are provided, the valve cover attachment/detachment position at which the valve cover-side bayonet claw portion 141 and the housing-side bayonet claw portion 142 do not interfere with each other is a position at which the valve cover-side bayonet claw portion 141 and the claw insertion portion 143 face each other in the valve body insertion direction (see an arrow in FIG. 9) as shown in FIG. 9. In the circumferential direction of the valve cover mounting opening portion 26, a position where the valve cover-side bayonet claw portion 141 and the claw insertion portion 143 overlap with each other is the valve cover attachment/detachment position.

In the insertion step, in a state in which the valve cover-side bayonet claw portion 141 is positioned at the valve cover attachment/detachment position where the valve cover-side bayonet claw portion 141 does not interfere with the housing-side bayonet claw portion 142, as shown by an arrow in FIG. 7(B) and an arrow in FIG. 9, the operation handle 155 is operated to push the insertion shaft 152, so that, as shown in FIG. 10, the valve cover-side bayonet claw portion 141 is inserted into the fitting groove portion 144 through the claw insertion portion 143 of the valve cover mounting opening portion 26, and the valve body 5 of the valve cover 4 is inserted into the valve cover mounting opening portion 26. Incidentally, in FIGS. 9 and 10, the valve body 5 and the valve operating shaft 42 of the valve cover 4 are not shown.

In this case, as shown in FIG. 9, in the axial direction (valve body insertion direction) of the valve cover mounting opening portion 26, an inner bottom wall portion of the fitting groove portion 144 abuts on the valve cover-side bayonet claw portion 141, so that insertion movement of the valve body 5 in the valve body insertion direction can be restricted. The inner bottom wall portion of the fitting groove portion 144 is provided as an insertion amount restricting portion 145 that restricts an insertion amount of the valve cover 4 into the valve cover mounting opening portion 26. As a result, in the insertion step, it is only necessary to insert the valve cover 4 into the valve cover mounting opening portion 26 until the insertion amount of the valve cover 4 is restricted by the insertion amount restricting portion 145, and the insertion step can be easily performed.

Figure 10A:
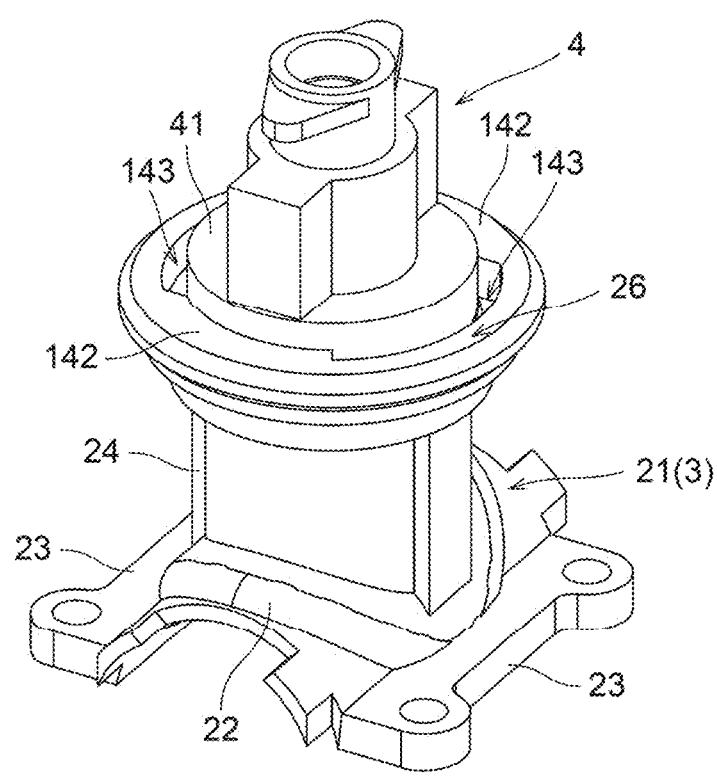
FIG. 10(A) is a perspective view showing the housing and the valve cover in a state in which the insertion step has been performed.
Figure 10B:
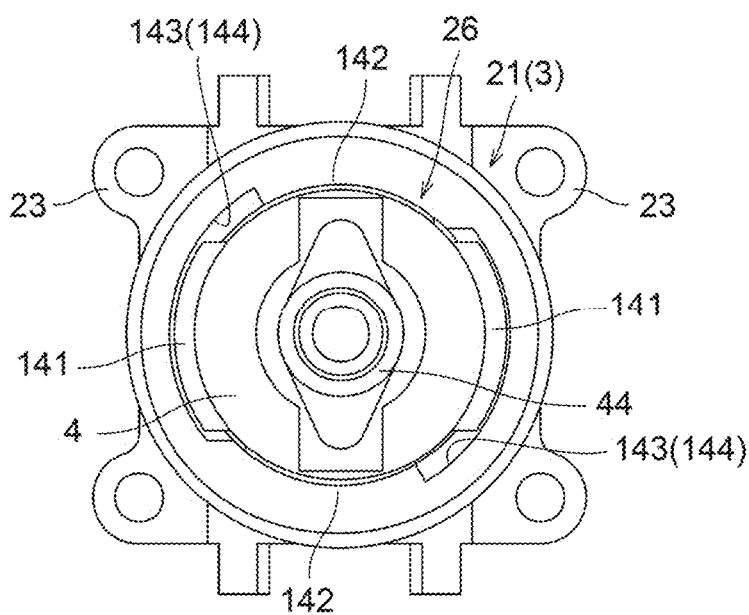
FIG. 10(B) is a plan view showing the housing and the valve cover in a state in which the insertion step has been performed.

In addition, as shown in FIG. 10(B), the claw insertion portion 143 is formed to be longer than the valve cover-side bayonet claw portion 141 in the circumferential direction of the valve cover mounting opening portion 26. As a result, it is easy to smoothly perform the position adjustment of the valve cover 4 with respect to the valve cover attachment/detachment position and the insertion step.

Here, in a case where the insertion step is performed using the insertion device 151 as shown in FIG. 7(B), an equal pressure pipe 161 for making the first split body 21 (housing 3) side and the insertion device 151 side have the same or substantially the same pressure is provided as shown in FIG. 8(A). One end portion of the equal pressure pipe 161 is connected to a housing-side connection portion 162 on the first split body 21 (housing 3) side, and the other end portion of the equal pressure pipe 161 is connected to an insertion device-side connection portion 163 on the insertion device 151 side.

As a result, in the insertion step, as shown in FIGS. 7(B) and 8(A), in a case where the insertion shaft 152 is pushed to insert the valve body 5 of the valve cover 4 into the valve cover mounting opening portion 26, the second rubber packing 92 (see FIG. 1) of the valve cover 4 and the inner wall portion of the valve cover mounting opening portion 26 of the first split body 21 come into contact with each other, and then the insertion shaft 152 is further pushed by a predetermined amount. In this case, when a pressure difference occurs between the first split body 21 (housing 3) side and the insertion device 151 side, a large pushing force is required. However, as shown in FIG. 8(A), the pressure difference between the first split body 21 (housing 3) side and the insertion device 151 side is set to zero or substantially zero by using the equal pressure pipe 161, so that further pushing of the insertion shaft 152 can be smoothly performed. Incidentally, in the drawings other than FIG. 8(A), the housing-side connection portion 162 is not shown.

(Rotation Step in Third Step)

Figure 11B:
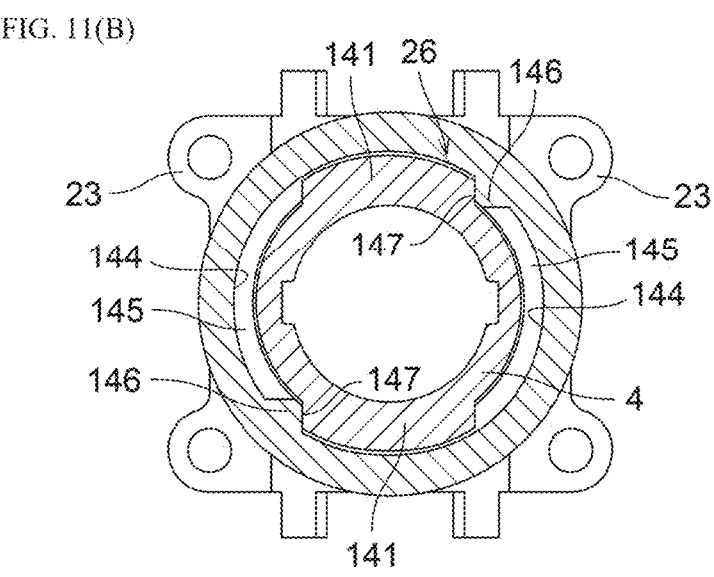
FIG. 11(B) is a cross-sectional view showing a state of a valve cover-side bayonet claw portion in a fitting groove portion in a state in which the rotation step has been performed.

In the rotation step, as shown by an arrow in FIG. 8(A) and an arrow in FIG. 11(A), the insertion shaft 152 is rotated by operating the operation handle 155 to rotate the valve cover 4 with respect to the first split body 21 in a state in which the valve cover-side bayonet claw portion 141 is fitted into the fitting groove portion 144, and as shown in FIG. 11, the valve cover-side bayonet claw portion 141 and the housing-side bayonet claw portion 142 are engaged with each other in a retaining manner in the valve body insertion direction. FIGS. 8(A)-8(C) and 11(A)-11(B) show a state in which the rotation step has been performed.

In a case of rotating the valve cover 4 with respect to the first split body 21, since the posture of the valve body 5 incorporated in the valve cover 4 also changes with the rotation of the valve cover 4, the posture of the valve body 5 in a state in which the rotation step has been performed is also different depending on a rotation amount of the valve cover 4. Therefore, when the rotation amount of the valve cover 4 is different, it is not possible to manage (ascertain) what posture the valve body 5 will assume in a state in which the rotation step has been performed.

Therefore, as shown in FIG. 11(B), the valve cover mounting opening portion 26 is provided with a rotation restricting portion 146 that restricts the rotation of the valve cover 4 at a site adjacent to the fitting groove portion 144 in the circumferential direction of the valve cover mounting opening portion 26. The rotation restricting portion 146 is formed in a protrusion shape that protrudes to an inner side of the valve cover mounting opening portion 26, and includes an abutting wall portion 147 that can abut on the valve cover-side bayonet claw portion 141 that is rotationally moved in the fitting groove portion 144.

In rotating the valve cover 4 with respect to the first split body 21, a rotation amount of the valve cover 4 is set to a certain predetermined rotation amount (for example, a rotation amount corresponding to 90 degrees) until the rotation is restricted by the rotation restricting portion 146. Therefore, the rotation step can be easily performed only by rotating the valve cover 4 until the valve cover-side bayonet claw portion 141 abuts on the abutting wall portion 147 of the rotation restricting portion 146, while the rotation amount of the valve cover 4 is set to a certain predetermined rotation amount.

When the insertion step and the rotation step in the third step are sequentially performed, as shown in FIG. 8(B), the insertion device 151 and the work valve 101 are detached and removed.

Here, the posture of the valve body 5 in a state in which the rotation step has been performed will be described.

As shown in FIGS. 11(A) and 11(B), in a case where the rotation of the valve cover 4 with respect to the housing 3 is restricted by the rotation restricting portion 146, the posture of the valve body 5 (not shown in FIGS. 11(A) and 11(B)) with respect to the fluid pipe 1 is maintained in a predetermined posture. As shown in FIG. 1, the predetermined posture is, for example, a posture along the radial direction (second direction) of the fluid pipe 1 perpendicular to the pipe axial direction (first direction) of the fluid pipe 1.

Regarding the predetermined posture, it is possible to set what posture is the predetermined posture depending on what kind of the sluice valve 2 is adopted as the sluice valve

2. In this embodiment, as the sluice valve 2, as shown in FIG. 3, the sluice valve 2 having an elastic deformation direction defining portion, such as the core material 62, which defines a direction in which the elastic sealing member 61 is elastically deformed, is adopted, so that the predetermined posture can be set in accordance with the direction defined by the elastic deformation direction defining portion. In the elastic deformation direction defining portion, since the direction in which the elastic sealing member 61 is elastically deformed is defined as the second direction (radial direction of the fluid pipe 1) perpendicular to the valve body insertion direction, the posture along the second direction (radial direction of the fluid pipe 1) perpendicular to the valve body insertion direction can be set as the predetermined posture.

By setting the predetermined posture in this way, as shown in FIG. 3, the valve body 5 installed in the predetermined posture can elastically deform the elastic sealing member 61 actively in the second direction (radial direction of the fluid pipe 1) perpendicular to the valve body insertion direction. Therefore, the elastic sealing member 61 can be appropriately brought into close contact with the entire circumference of the inner wall portion 12 of the fluid pipe 1, and the flow passage of the fluid pipe 1 can be appropriately put into a closed state.

In the rotation step, as shown in FIGS. 10(A), 10(B), 11(A), and 11(B), the valve cover 4 is rotated by a predetermined rotation amount (for example, a rotation amount corresponding to 90 degrees), so that the posture of the valve body 5 (not shown in FIGS. 10(A), 10(B), 11(A), and 11(B)) incorporated in the valve cover 4 also becomes a posture rotated by the predetermined rotation amount. Therefore, in the insertion step before the rotation step, the posture of the valve body 5 with respect to the fluid pipe 1 in a state in which the rotation step has been performed can be managed (ascertained) by managing (ascertaining) the posture of the valve body 5 with respect to the fluid pipe 1.

Therefore, the valve cover attachment/detachment position in the insertion step (see FIGS. 7(B) and 9) is set in accordance with the predetermined posture of the valve body 5 in the rotation step. That is, at the valve cover attachment/detachment position, the posture of the valve body 5 with respect to the fluid pipe 1 is a posture obtained by rotating the valve body 5 by a predetermined rotation amount in a direction opposite to the rotation step from the predetermined posture. In this embodiment, in the rotation step, the valve cover 4 is rotated by a rotation amount corresponding to 90 degrees, so that the posture of the valve body 5 with respect to the fluid pipe 1 is a posture along the first direction (pipe axial direction of the fluid pipe 1) at the valve cover attachment/detachment position, as shown in FIG. 7(B).

For that reason, as shown in FIG. 9, the housing-side bayonet claw portion 142 is provided in a pair at positions facing each other in the first direction (pipe axial direction of the fluid pipe 1, a direction connecting a diagonal right rear side and a diagonal left front side in FIG. 9), and the claw insertion portion 143 is provided in a pair at positions facing each other in the second direction (radial direction of the fluid pipe 1, a left-right direction in FIG. 9). Therefore, in the insertion step, as shown in FIG. 9, the valve cover 4 is positioned with respect to the valve cover attachment/detachment position where the valve cover-side bayonet claw portion 141 and the claw insertion portion 143 overlap with each other in the circumferential direction of the valve cover mounting opening portion 26, so that the valve body 5 has a posture along the first direction (pipe axial direction of the fluid pipe 1) as shown in FIG. 7(B).

(Valve Cover Fixing Member Attachment Step in Third Step)

In the valve cover fixing member attachment step, as shown in FIGS. 8(C), 11(A), and 12(A)-12(B), the valve cover fixing member 6 is attached in a rotation restricting state in which the valve cover fixing member 6 abuts on the valve cover 4 to restrict the rotation of the valve cover 4. FIG. 11(A) shows the valve cover fixing member 6 before being attached, and FIG. 12 shows a state in which the valve cover fixing member 6 is attached. Incidentally, in FIGS. 11 and 12, the screw hole portion formed in the downward extending portion 72 in the valve cover fixing member 6 is not shown.

As shown in FIG. 11(A), the valve cover fixing member 6 includes a claw insertion fitting portion 73 that fits into the claw insertion portion 143 provided in the valve cover mounting opening portion 26 of the housing 3. The claw insertion fitting portion 73 and the downward extending portion 72 are disposed at different positions in a circumferential direction of the covering portion 71. As a result, as shown in FIG. 12, the valve cover fixing member 6 is attached in a state of fitting the claw insertion fitting portion 73 into the claw insertion portion 143, so that the valve cover fixing member 6 can be attached in the rotation restricting state in which the claw insertion fitting portion 73 abuts on the valve cover-side bayonet claw portion 141 to restrict the rotation of the valve cover 4.

As shown in FIG. 11(A), the claw insertion fitting portion 73 is formed in a shape corresponding to a part of a ring in correspondence with the claw insertion portion 143 having a shape corresponding to a part of a ring, and is configured to be fitted into the claw insertion portion 143. As described above, since the claw insertion fitting portion 73 can be fitted into the claw insertion portion 143, the valve cover fixing member 6 can be easily attached in the rotation restricting state only by fitting the claw insertion fitting portion 73 into the claw insertion portion 143.

Figure 12A:
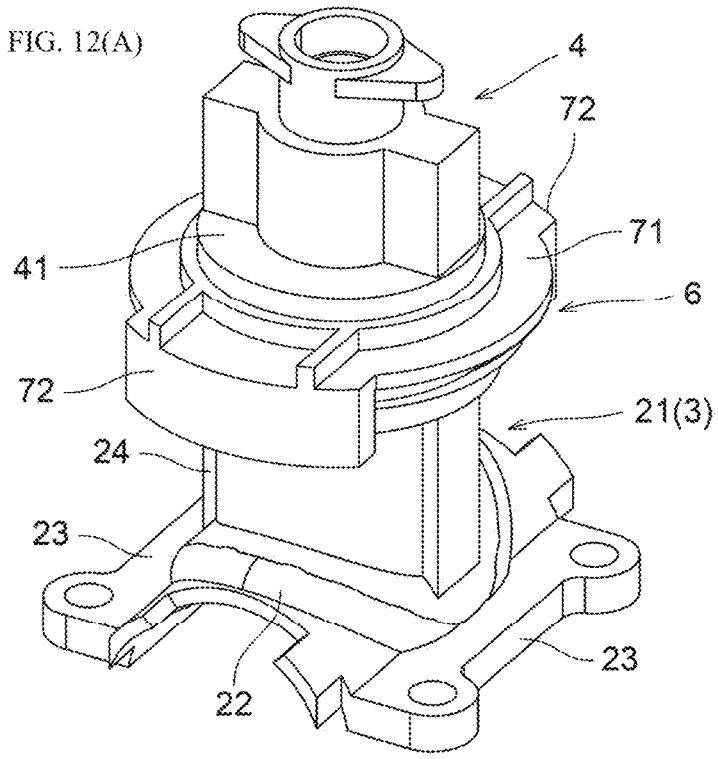
FIG. 12(A) is a perspective view showing the housing, the valve cover, and a valve cover fixing member in a state in which the valve cover fixing member attachment step has been performed.
Figure 12B:
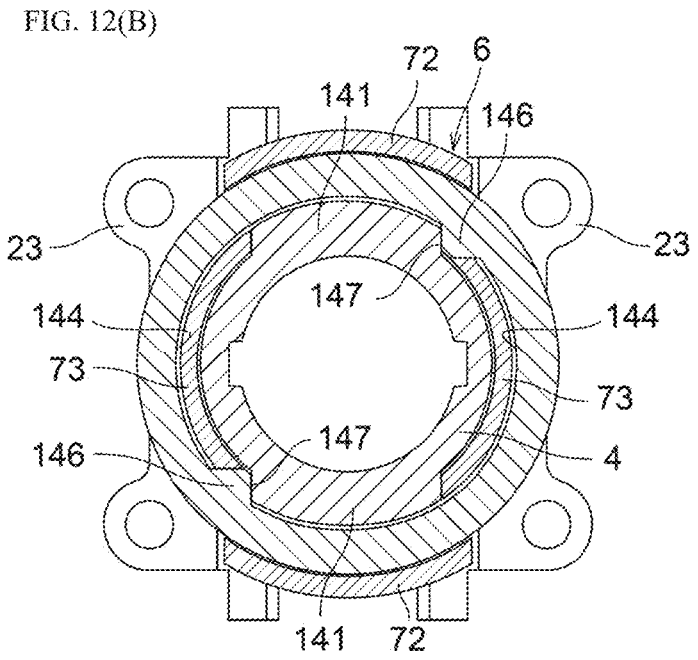
FIG. 12(B) is a cross-sectional view showing a state of the valve cover-side bayonet claw portion and a claw insertion fitting portion in the fitting groove portion in a state in which the valve cover fixing member attachment step has been performed.

By attaching the valve cover fixing member 6 in the rotation restricting state, as shown in FIG. 12(B), in the circumferential direction of the valve cover mounting opening portion 26, the valve cover-side bayonet claw portion 141 fitted into the fitting groove portion 144 can be fixed in a state of being sandwiched between the rotation restricting portion 146 and the claw insertion fitting portion 73. As a result, rotational movement of the valve cover 4 can be appropriately suppressed, and clattering of the valve cover 4 can also be appropriately prevented.

In a case where the valve cover fixing member 6 is attached in the rotation restricting state, as shown in FIG. 2, the valve cover 4 is fixed in a state of being sandwiched between the valve cover fixing member 6 and the first split body 21 by fastening the set screw 83 in a state of abutting on the outer wall portion of the first split body 21.

The sluice valve 2 is installed in the fluid pipe 1 by performing each of the first to third steps described above. However, as shown in FIGS. 1 and 3, a guide mechanism is provided for guiding the valve body 5 in the valve body insertion direction (downward side in FIGS. 1 and 3) when the sluice valve 2 is brought into a closed state in a state in which the sluice valve 2 is installed in the fluid pipe 1. This guide mechanism is composed of the engagement piece 53 of the valve body 5, the valve cover-side guide groove portion 45 of the valve cover 4, the housing-side guide groove portion 28 of the first split body 21, and the like. In installing the sluice valve 2 in the fluid pipe 1, it is required to install the sluice valve 2 such that the valve body 5 can be appropriately guided in the valve body insertion direction by the guide mechanism. Hereinafter, the guide mechanism will be described.

Figure 13A:
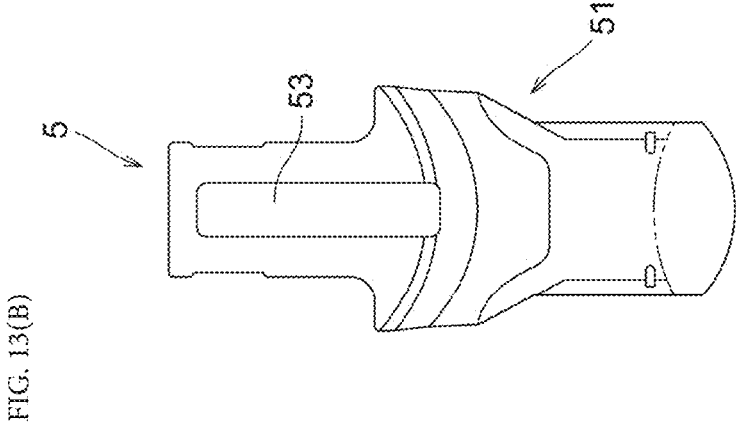
FIG. 13(A) is a side view showing a valve body in a direction perpendicular to the pipe axial direction of the fluid pipe.
Figure 13B:
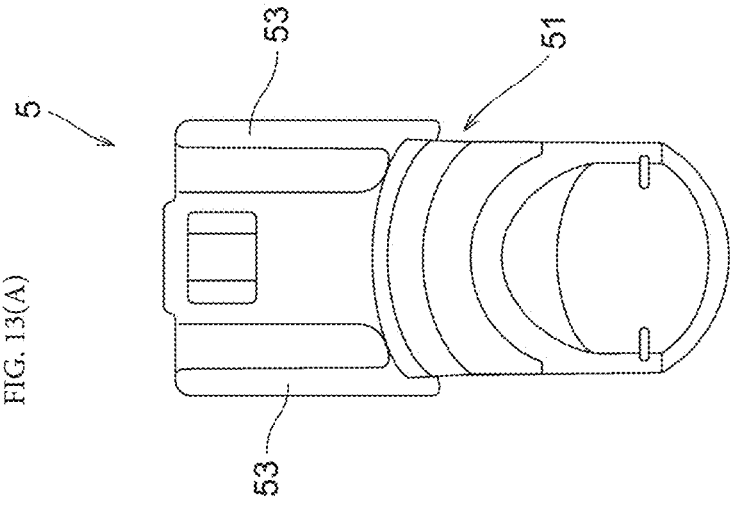
FIG. 13(B) is a side view showing the valve body in a direction along the pipe axial direction of the fluid pipe.

The valve body 5 is provided with the engagement piece 53 having a protrusion shape that is projected outward, as shown in FIGS. 13(A) and 13(B). The inner wall portion in the valve cover main body portion 41 of the valve cover 4 is provided with the valve cover-side guide groove portion 45 having a recessed shape, as shown in FIG. 14(A). As shown in FIG. 1, the engagement piece 53 and the valve cover-side guide groove portion 45 are provided to be engageable with each other. Incidentally, FIG. 14(A) is a perspective view of the valve cover 4 as viewed diagonally from below, in which the incorporated valve body 5, valve operating shaft 42, and the like are omitted.

The engagement piece 53 of the valve body 5 and the valve cover-side guide groove portion 45 of the valve cover 4 are also each provided in a pair at positions facing each other. As shown in FIG. 1, the engagement piece 53 is provided in a posture projecting to an outer side along the second direction (radial direction perpendicular to the pipe axial direction of the fluid pipe 1). As shown in FIG. 14(A), the valve cover-side guide groove portion 45 is disposed at a position rotated by a predetermined rotation amount (rotation amount corresponding to 90 degrees) with respect to the mounting position of the valve cover-side bayonet claw portion 141 in the circumferential direction of the valve cover main body portion 41.

By the engagement between the pair of engagement pieces 53 and the pair of valve cover-side guide groove portions 45, the valve body 5 is provided to be nonrotatable relative to the valve cover 4. As a result, for example, in a case where the valve operating shaft 42 is rotationally operated, the valve body 5 can be prevented from rotating with respect to the valve cover 4 be moved in the valve body insertion direction in a stable posture.

Figure 14B:
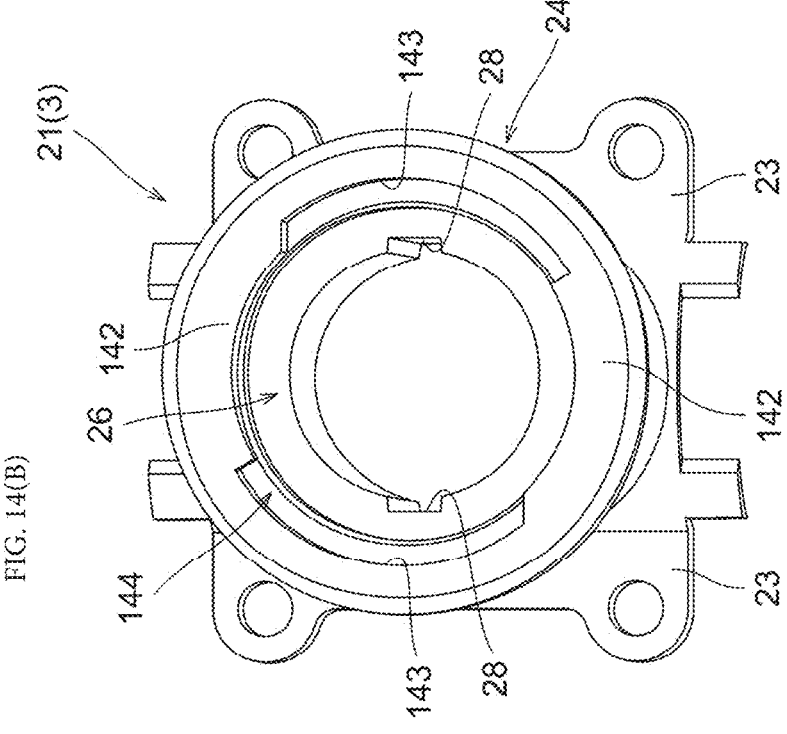
FIG. 14(B) is a perspective view of a first split body as viewed from an upper side.
Figure 14A:
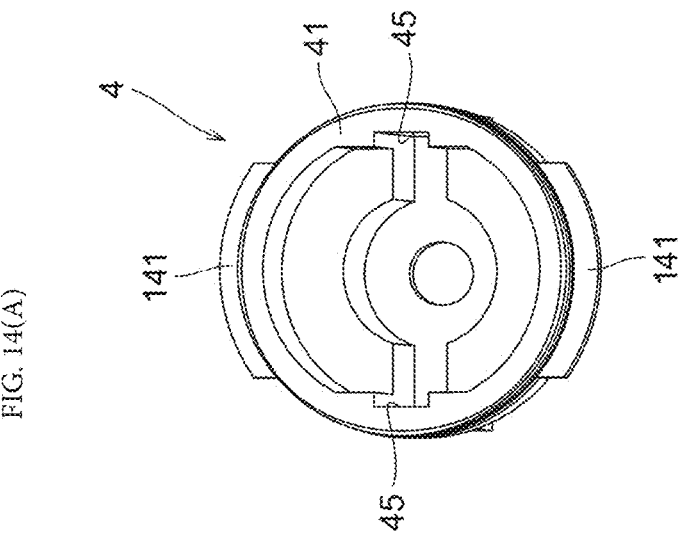
FIG. 14(A) is a perspective view of the valve cover as viewed from a lower side in a state in which the valve body, a valve operating shaft, and the like are omitted.

In the first split body 21 (housing 3), as shown in FIG. 14(B), the housing-side guide groove portion 28 having a recessed shape is provided in an inner wall portion in the housing cylindrical portion 24, and as shown in FIG. 3, the engagement piece 53 and the housing-side guide groove portion 28 are provided to be engageable with each other. The housing-side guide groove portion 28 is also provided in a pair at positions facing each other in the housing cylindrical portion 24, as in the engagement piece 53 and the valve cover-side guide groove portion 45. The housing-side guide groove portion 28 is disposed at the same position as the claw insertion portion 143 in the circumferential direction of the valve cover mounting opening portion 26, and is disposed at a position rotated by a predetermined rotation amount (rotation amount corresponding to 90 degrees) with respect to the mounting position of the housing-side bayonet claw portion 142.

As described above, the engagement piece 53, the valve cover-side guide groove portion 45, and the housing-side guide groove portion 28 are each provided in a pair. Therefore, in order to guide the valve body 5 in the valve body insertion direction, it is required that, in a case of installing the sluice valve 2, as shown in FIGS. 1 and 3, the pair of valve cover-side guide groove portions 45 and the pair of housing-side guide groove portions 28 are continuously present in the valve body insertion direction, and the pair of engagement pieces 53 are engaged with the pair of valve cover-side guide groove portions 45 and the pair of housing-side guide groove portions 28 to be movable.

Figures 15A, 15B, 15C:
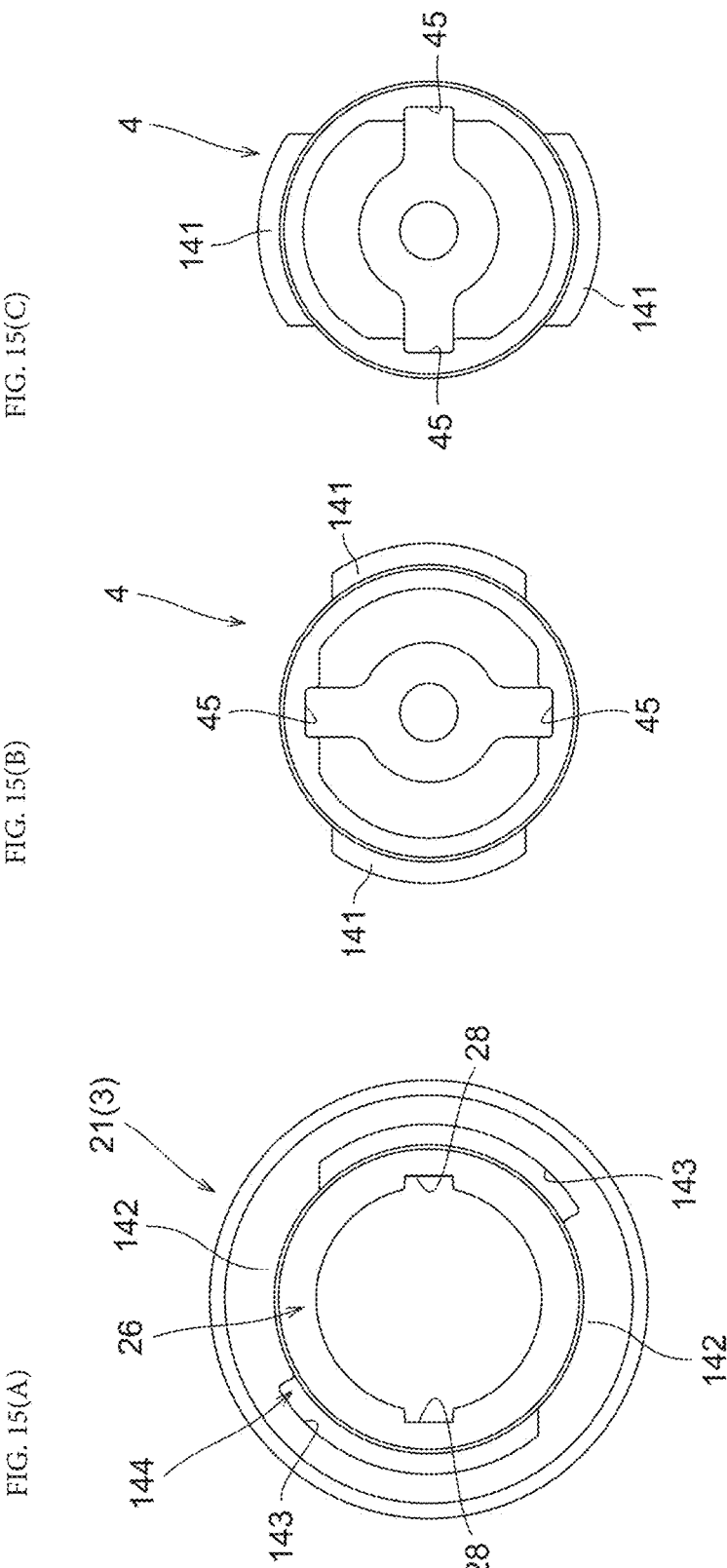
FIG. 15(A) is a plan view of a valve cover mounting opening portion of the first split body.
FIG. 15(B) is a bottom view of the valve cover as viewed from a lower side in a state in which the valve body is omitted.
FIG. 15(C) is a bottom view of the valve cover as viewed from a lower side in a state in which the valve body is omitted.

In the insertion step in the third step, as shown in FIGS. 9 and 10, the valve body 5 (not shown in FIG. 9) of the valve cover 4 is inserted into the valve cover mounting opening portion 26 in a state in which the valve cover 4 is positioned with respect to the valve cover mounting opening portion 26 in the housing cylindrical portion 24 of the first split body 21 at the valve cover attachment/detachment position where the valve cover-side bayonet claw portion 141 and the housing-side bayonet claw portion 142 do not interfere with each other. In this case, a relative positional relationship between the valve cover-side guide groove portion 45 and the housing-side guide groove portion 28 is such that, with respect to the housing-side guide groove portion 28 of the first split body 21 (housing 3) in the circumferential direction of the valve cover mounting opening portion 26 as shown in FIG. 15(A), the valve cover-side guide groove portion 45 of the valve cover 4 is placed at a position rotated by a predetermined rotation amount (rotation amount corresponding to 90 degrees) as shown in FIG. 15(B). Incidentally, FIG. 15(A) is a plan view showing the valve cover mounting opening portion 26 of the first split body 21 and the like, and FIGS. 15(B) and 15(C) are bottom views of the valve cover 4 in which the valve body 5 is omitted, as viewed from below.

At the valve cover attachment/detachment position in the insertion step, as shown in FIGS. 15(A) and 15(B), the valve cover-side guide groove portion 45 and the housing-side guide groove portion 28 are placed at different positions in the circumferential direction of the valve cover mounting opening portion 26, and the valve cover-side guide groove portion 45 is in a state of being rotated by a predetermined rotation amount (rotation amount corresponding to 90 degrees) with respect to the housing-side guide groove portion 28. Therefore, in a state in which the insertion step has been performed, as shown in FIG. 16(A), the valve cover-side guide groove portion 45 is not present at a position continuous with the housing-side guide groove portion 28 in the valve body insertion direction (downward side in FIGS. 16(A) and 16(B)).

In the rotation step in the third step, as shown in FIG. 11, the valve cover 4 is rotated with respect to the first split body 21, and the rotation amount at that time is set to a certain predetermined rotation amount (for example, a rotation amount corresponding to 90 degrees). As a result, the relative positional relationship between the valve cover-side guide groove portion 45 and the housing-side guide groove portion 28 is rotationally moved to a position where the valve cover-side guide groove portion 45 of the valve cover 4 matches the housing-side guide groove portion 28 of the first split body 21 (housing 3) as shown in FIG. 15(C) in the circumferential direction of the valve cover mounting opening portion 26 as shown in FIG. 15(A).

Figure 16A:
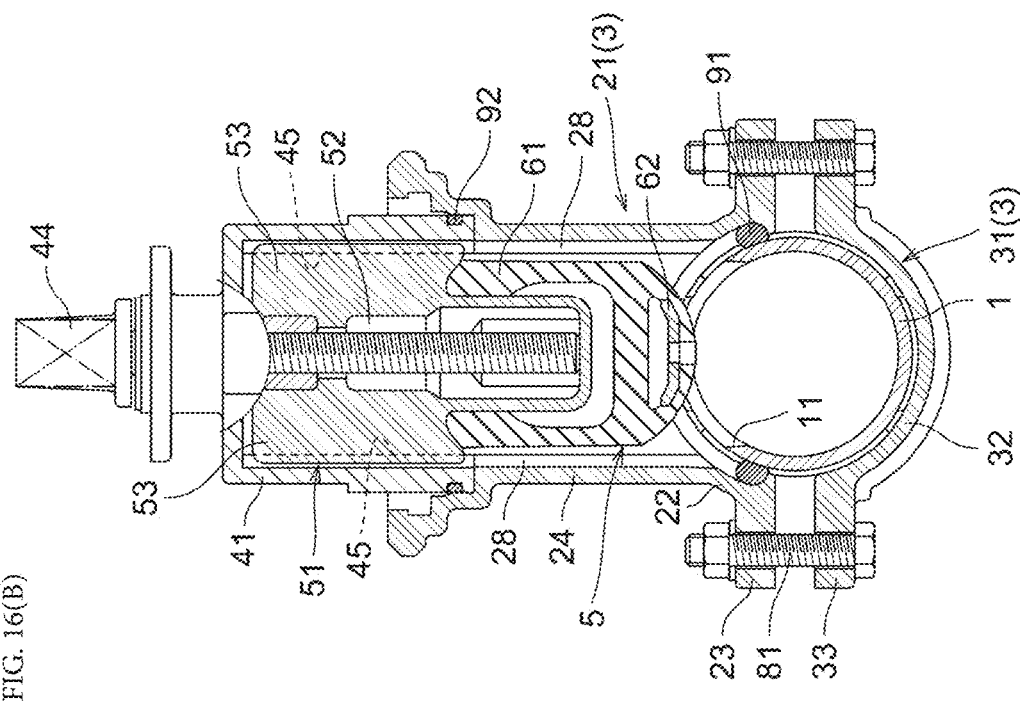
FIG. 16(A) is a vertical sectional view of the fluid pipe and the sluice valve in a state in which the insertion step has been performed in a direction perpendicular to the pipe axial direction of the fluid pipe.
Figure 16B:
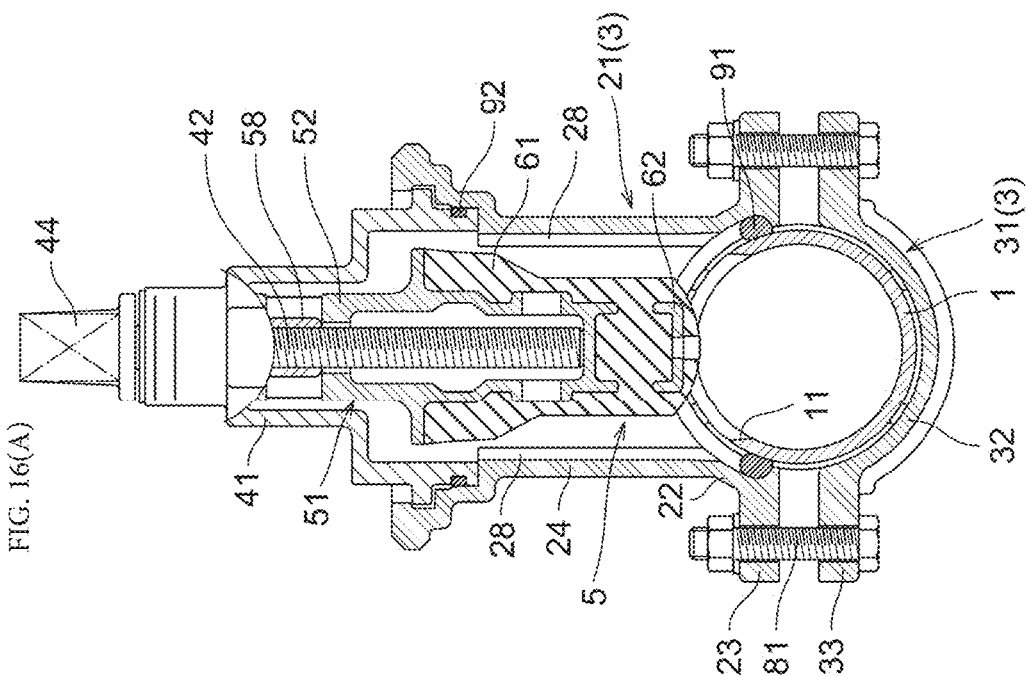
FIG. 16(B) is a vertical sectional view of the fluid pipe and the sluice valve in a state in which the rotation step has been performed in the direction perpendicular to the pipe axial direction of the fluid pipe.

By performing the rotation step, as shown in FIGS. 15(A) and 15(C), the housing-side guide groove portion 28 and the valve cover-side guide groove portion 45 are present at positions where they match each other in the circumferential direction of the valve cover mounting opening portion 26, and as shown in FIG. 16(B), the valve cover-side guide groove portion 45 and the housing-side guide groove portion 28 are present at positions where they are continuous in the valve body insertion direction (downward side in FIGS. 16(A) and 16(B)).

As described above, as shown in FIGS. 15(A), 15(B), and 16(A), at the valve cover attachment/detachment position in the insertion step, the pair of valve cover-side guide groove portions 45 are disposed in a positional relationship in which the pair of valve cover-side guide groove portions 45 are rotated by a predetermined rotation amount (rotation amount corresponding to 90 degrees) with respect to the pair of housing-side guide groove portions 28 in a direction opposite to the direction in the rotation step. By performing the rotation step following the insertion step, as shown in FIGS. 15(A), 15(C), and 16(B), the pair of valve cover-side guide groove portions 45 are rotated by a predetermined rotation amount (rotation amount corresponding to 90 degrees) with respect to the pair of housing-side guide groove portions 28 and are positioned at positions where the pair of valve cover-side guide groove portions 45 match the pair of housing-side guide groove portions 28 in the circumferential direction of the valve cover mounting opening portion 26.

As described above, the relative positional relationship between the valve cover-side guide groove portion 45 and the housing-side guide groove portion 28 is set as a positional relationship in which the valve cover-side guide groove portion 45 is rotated by a predetermined rotation amount (rotation amount corresponding to 90 degrees) in a direction opposite to the direction in the rotation step at the valve cover attachment/detachment position in the insertion step. Thus, in a case where the rotation step has been performed, as shown in FIG. 16(B), the relative positional relationship between the valve cover-side guide groove portion 45 and the housing-side guide groove portion 28 is in a continuous state in which the valve cover-side guide groove portion 45 and the housing-side guide groove portion 28 are continuous in the valve body insertion direction (downward side in FIGS. 16(A) and 16(B)) and the pair of engagement pieces 53 of the valve body 5 (corresponding to the valve body-side guided portion) is engaged with the valve cover-side guide groove portion 45 and the housing-side guide groove portion 28 to be movable.

Here, in a case where the insertion step in the third step has been performed, when the housing-side guide groove portion 28 interferes with the valve cover-side guide groove portion 45 or the engagement piece 53 of the valve body 5, the rotation of the valve cover 4 is restricted by abutment between the housing-side guide groove portion 28 and the valve cover-side guide groove portion 45 or the engagement piece 53 of the valve body 5, and the rotation step of rotating the valve cover 4 with respect to the first split body 21 cannot be performed.

Therefore, in this embodiment, when the insertion step in the third step has been performed, as shown in FIG. 16(B), in the valve body insertion direction (downward side in FIGS. 16(A) and 16(B)), the valve cover-side guide groove portion 45 and the engagement piece 53 of the valve body 5 do not protrude to the first split body 21 side and are provided at positions where they are retracted with respect to the housing-side guide groove portion 28 to a side opposite to the valve body insertion direction. As described above, in a case where the insertion step has been performed in the third step, the relative positional relationship between the housing-side guide groove portion 28, the valve cover-side guide groove portion 45, and the engagement piece 53 of the valve body 5 is set to a non-interference state in which they do not interfere with each other. As a result, the rotation step can be appropriately performed following the insertion step without interference between the housing-side guide groove portion 28 and the valve cover-side guide groove portion 45 or the engagement piece 53 of the valve body 5.

OTHER EMBODIMENTS

Other embodiments of the present invention will be described. Configurations of individual embodiments described below can be adopted not only solely but also in combination with configurations of another embodiment can also be adopted.

(1) In the embodiment described above, the valve cover-side bayonet claw portion 141 and the housing-side bayonet claw portion 142 are each provided in a pair, but the number of the valve cover-side bayonet claw portions 141 and the housing-side bayonet claw portions 142 can be appropriately changed.

(2) In the embodiment described above, an example is shown in which the rotation restricting portion 146 is provided to restrict the rotation of the valve cover 4 with respect to the housing 3 in the rotation step, but the rotation restricting portion 146 is dispensable.

In addition, in a case where the rotation restricting portion 146 is provided, an abutting portion is not limited to the abutting wall portion 147 that abuts on the valve cover-side bayonet claw portion 141, but various abutting portions that abut on the valve cover 4, for example, can be employed.

INDUSTRIAL APPLICABILITY

The present invention can be suitably used for a sluice valve installation method and a sluice valve installation structure used in the sluice valve installation method with which installation work of a sluice valve can be simplified while preventing an attachment portion between a housing and a valve cover from being increased in size.

REFERENCE SIGNS LIST

1: fluid pipe
2: sluice valve
3: housing
4: valve cover
5: valve body
6: valve cover fixing member (covering body)
11: through-hole
26: valve cover mounting opening portion
28: housing-side guide groove portion
45: valve cover-side guide groove portion
53: engagement piece (valve body-side guided portion)
73: claw insertion fitting portion
101: work valve
141: valve cover-side bayonet claw portion
142: housing-side bayonet claw portion
143: claw insertion portion
144: fitting groove portion
146: rotation restricting portion
147: abutting wall portion

The invention claimed is:

1. A sluice valve installation method of installing a sluice valve in a fluid pipe, the sluice valve being configured to open and close a flow passage of the fluid pipe in an uninterrupted flow state, the method comprising:
   a first step of attaching a housing of the sluice valve and a work valve configured to open and close a valve cover mounting opening portion of the housing to the fluid pipe;
   a second step of opening and closing the work valve to perforate the fluid pipe to form a through-hole through the valve cover mounting opening portion of the housing; and
   a third step of opening and closing the work valve to attach a valve cover incorporating a valve body to the housing to allow the valve body of the sluice valve to be inserted into the fluid pipe through the through-hole of the fluid pipe,
   wherein the third step comprises
   an insertion step of inserting a valve cover-side bayonet claw portion provided in the valve cover into a fitting groove portion provided in the valve cover mounting opening portion of the housing through a claw insertion portion provided in the valve cover mounting opening portion of the housing at a valve cover attachment/detachment position where the valve cover-side bayonet claw portion does not interfere with a housing-side bayonet claw portion corresponding to a part of the fitting groove portion thereby to insert the valve body of the valve cover into the valve cover mounting opening portion of the housing, and
   a rotation step of rotating the valve cover with respect to the housing with the valve cover-side bayonet claw portion being fitted into the fitting groove portion of the housing to cause the valve cover-side bayonet claw portion and the housing-side bayonet claw portion to be engaged with each other and retained in a valve body insertion direction.

2. The sluice valve installation method according to claim 1,
   wherein, in the third step, after the insertion step and the rotation step, a covering body attachment step is performed to attach a covering body that covers a part of the valve cover in a rotation restricting state in which the covering body abuts on the valve cover to restrict rotation of the valve cover.

3. The sluice valve installation method according to claim 1,
   wherein, in the rotation step, the valve cover is rotated with respect to the housing by a predetermined rotation amount until rotation of the valve cover is restricted by a rotation restricting portion provided in the housing, and
   in a case where the rotation of the valve cover with respect to the housing is restricted by the rotation restricting portion, a posture of the valve body with respect to the fluid pipe is maintained in a predetermined posture.

4. A sluice valve installation structure used in the sluice valve installation method according to claim 1, the sluice valve installation structure comprising:
   the housing-side bayonet claw portion, the claw insertion portion, and the fitting groove portion that are provided in the valve cover mounting opening portion of the housing,
   wherein the housing-side bayonet claw portion and the claw insertion portions are each disposed in a plurality in a state in which mounting positions thereof are different from each other in a circumferential direction of the valve cover mounting opening portion of the housing,
   the fitting groove portion is provided to be continuous with the claw insertion portion in an axial direction of the valve cover mounting opening portion and to extend in the circumferential direction of the valve cover mounting opening portion of the housing, and
   the valve cover comprises a plurality of the valve cover-side bayonet claw portions provided on an outer peripheral portion thereof to be spaced apart from each other in a circumferential direction of the valve cover.

5. The sluice valve installation structure according to claim 4, wherein a claw insertion fitting portion is provided in a covering body that covers a part of the valve cover to be fitted into the claw insertion portion of the housing, and the covering body is configured to be attached to fit the claw insertion fitting portion into the claw insertion portion, whereby the covering body is attachable in a rotation restricting state in which the claw insertion fitting portion abuts on the valve cover-side bayonet claw portion to restrict rotation of the valve cover.

6. The sluice valve installation structure according to claim 4, wherein a rotation restricting portion is provided that is configured to restrict the rotation of the valve cover with respect to the housing and comprises an abutting wall portion configured to abut on the valve cover-side bayonet claw portion that is rotationally moved in the fitting groove portion.

7. The sluice valve installation structure according to claim 4, wherein the valve cover comprises valve cover-side guide groove portion configured to engage with a valve body-side guided portion of the valve body to guide the valve body in a valve body insertion direction, the housing comprises a housing-side guide groove portion configured to engage with the valve body-side guided portion of the valve body to guide the valve body in the valve body insertion direction, in a case where the insertion step has been performed in the third step, a relative positional relationship between the housing-side guide groove portion, the valve cover-side guide groove portion, and the valve body-side guided portion is placed in a non-interference state in which the housing-side guide groove portion, the valve cover-side guide groove portion, and the valve body-side guided portion do not interfere with each other, and in a case where the rotation step has been performed in the third step, a relative positional relationship between the valve cover-side guide groove portion and the housing-side guide groove portion is placed in a continuous state in which the valve cover-side guide groove portion and the housing-side guide groove portion are continuous in the valve body insertion direction, and the valve body-side guided portion is engaged with the valve cover-side guide groove portion and the housing-side guide groove portion to be movable.

\* \* \* \* \*